(12) United States Patent
Nakamura et al.

(10) Patent No.: US 6,353,536 B1
(45) Date of Patent: Mar. 5, 2002

(54) ELECTRONIC EQUIPMENT SYSTEM AND EXTENSION DEVICE FOR EXPANDING THE FUNCTIONS OF ELECTRONIC EQUIPMENT

(75) Inventors: Hiroshi Nakamura; Kazuya Shibasaki, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/339,213

(22) Filed: Jun. 24, 1999

(30) Foreign Application Priority Data

| Jun. 25, 1998 | (JP) | 10-178784 |
| Jul. 8, 1998 | (JP) | 10-192958 |
| Aug. 27, 1998 | (JP) | 10-241532 |

(51) Int. Cl.⁷ .............................. H05K 7/20
(52) U.S. Cl. .............. 361/686; 361/687; 361/695; 710/101
(58) Field of Search .................. 361/683, 686, 361/687, 694–695; 439/136, 341, 347; 454/184; 710/101–103

(56) References Cited

U.S. PATENT DOCUMENTS

| 4,969,830 A | * 11/1990 | Daly et al. ............... 439/136 |
| 5,694,292 A | 12/1997 | Paulsel et al. |
| 5,768,101 A | * 6/1998 | Cheng ..................... 361/687 |
| 6,094,347 A | * 7/2000 | Bhatia ..................... 361/695 |
| 6,119,184 A | * 9/2000 | Takahama et al. ...... 361/686 |
| 6,141,209 A | * 10/2000 | Kerrigan et al. ......... 361/683 |

FOREIGN PATENT DOCUMENTS

| JP | 7-311632 | 11/1995 |
| JP | 8-087348 | 4/1996 |
| JP | 8-274480 | 10/1996 |
| JP | 10-275032 | 10/1998 |

* cited by examiner

*Primary Examiner*—Gregory Thompson
(74) *Attorney, Agent, or Firm*—Finnegan, Henderson, Farabow, Garrett & Dunner, L.L.P.

(57) ABSTRACT

An electronic apparatus system comprises a portable computer and an extension device for expanding the function of the portable computer. The extension device includes a base, which has a mounting portion on which the portable computer is removably mounted, an exhaust port opened in the mounting portion of the base and a fan unit housed in the base and arranged to supply cooling air to the exhaust port. The base has a plurality of convex portions formed in a bottom wall that extend upward towards the exhaust port and form a foreign matter capturing region in the base. The base includes an exhaust passage for channeling cooling air from the fan over the bottom surface of the portable computer. The fan unit is inclined so that the axis of rotation is tilted toward the opening in the side wall of the mounting portion at the end of the exhaust passage. A seal is formed around the exhaust passage on the top surface of the mounting portion so that when the portable computer engages the extension device, an air seal is formed to prevent cooling air from exhausting except through the opening in the side wall of the extension device.

3 Claims, 27 Drawing Sheets

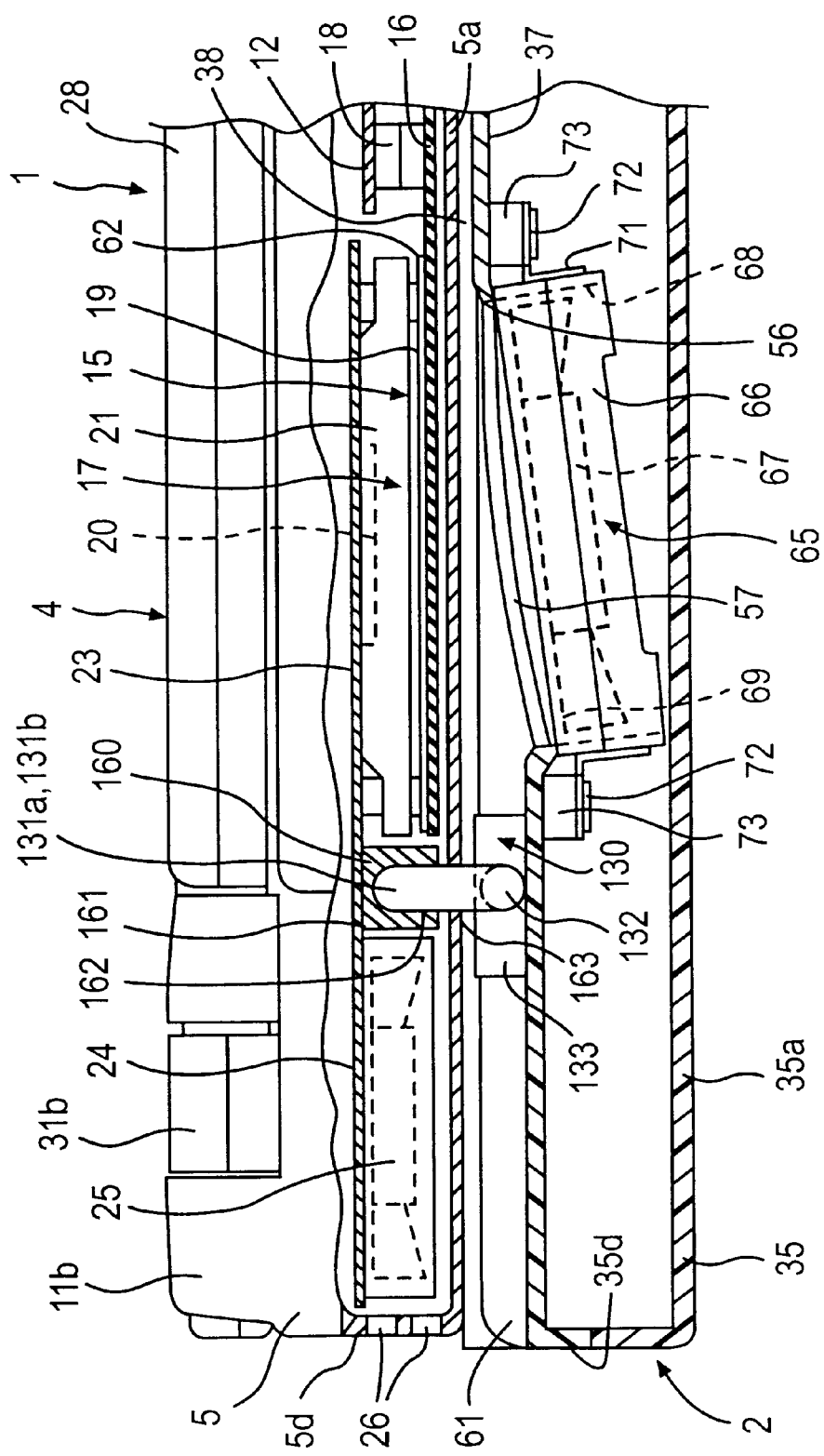

ELECTRONIC EQUIPMENT SYSTEM AND EXTENSION DEVICE FOR EXPANDING THE FUNCTIONS OF ELECTRONIC EQUIPMENT

FIELD OF THE INVENTION

The present invention relates to an electronic equipment system comprising a portable electronic device such as a portable computer, and an extension device for expanding the functions of the electronic device and for connecting external peripheral equipment to the electronic device.

DISCUSSION OF THE BACKGROUND

The increasing portability of electronic equipment such as portable computers and mobile communication terminal equipment have the increased commercial value of such electronic equipment. Emphasis has been placed on decreasing the size and the weight of such electronic equipment, so that the equipment can be easily carried in a purse, bag, briefcase, or the like.

As the housing of the portable electronic equipment becomes a more compact size, it becomes increasingly difficult to maintain space for installing connectors for connecting the portable electronic equipment to external peripheral equipment and for accommodating memory device drives such as a floppy disk drive or a CD ROM drive. Accordingly, portable computers typically have a special expansion connector for connecting to an extension device (typically called a docking station). The extension device allows a portable computer to have increased functionality comparable to that of installation-type computers.

The extension device typically has a base with a flat box shape. The upper surface of the base forms a flat mounting surface on which the portable computer can be detachably mounted.

The base includes a circuit board on which a variety of circuit components are mounted, a floppy disk drive and a CD-ROM drive. Furthermore, the side walls or the rear wall of the base include a plurality of connectors for connection to various external terminal equipment such as an external keyboard, an external display, or a printer. These floppy disk drive, CD-ROM drive, circuit board and connector are electrically connected to the portable computer through the expansion connector when the portable computer is mounted on the mounting surface of the base.

The processing speed of the microprocessing units (MPUs) in portable computers has been increasing as well as the diversity of functionality for processing multimedia data. Corresponding to this increased processing capability, the MPUs consume increasingly more power and thereby generating increasing amounts of heat. When such MPUs are contained in the housing of a portable computer, the need to efficiently radiate heat from the MPU to outside the housing increases.

The portable computer typically is directly cooled by forced air convection. The extension device includes a fan unit. The ability of the cooling system of the extension device is determined by the blowing capability of the fan unit and the diameter of the exhaust port. To enhance the cooling ability of the housing, therefore, the size of the cooling fan is increased and the diameter of the exhaust port is increased in proportion thereto.

According to this constitution, however, when the portable computer is removed from the base, a large exhaust port remains exposed in the mounting surface of the base. When a user accidentally drops foreign matter, such as a clip or a staple of a stapler, on the mounting surface, such foreign matter may fall through the exhaust port and enter the base where electronic parts such as a circuit board and the components are located. When the foreign matter is electrically conductive, such foreign matter may short circuit the electronic components in the extension device, thereby damaging or rendering the extension device inoperable.

In order to prevent foreign matter from entering the exhaust port, the diameter of the exhaust port is decreased or a grid-like guard is installed on the exhaust port to prevent the infiltration of foreign matter. However, decreasing the area of the exhaust port reduces the flow of the cooling air and increases the flow resistance of the cooling air. Consequently, the amount of cooling air that is exhausted from the exhaust port is decreased, and the cooling performance of the housing is not sufficiently maintained.

According to the conventional cooling system, the exhaust port for exhausting the cooling air is arranged at a position corresponding to the MPU. In the conventional portable computers, in general, the MPU is typically located in a rear part of the housing separated away from the palm rest to suppress the effect of heat to the user. Therefore, the exhaust port of the base is formed at a position away from the central portion of the mounting surface. In the conventional cooling system, therefore, the cooling air blown from the exhaust port is blown to the rear part of the bottom wall of the housing, and is released from the extension device through a gap between the bottom wall and the mounting surface. Therefore, the bottom wall of the housing is cooled only locally.

In the conventional cooling system, furthermore, the air in the base is sucked by the fan unit. For this purpose, a plurality of suction ports is formed in the side walls or in the bottom wall of the base. When the fan unit is driven, a negative pressure acts on the suction ports, and the air on the outer side of the extension device is drawn into the base through the suction ports. According to this constitution, however, when the extension device is placed on the top board of a desk, the suction ports face the top board or the suction ports are positioned close to the top board, permitting dust and dirt on the top board to be easily drawn into the base through the suction ports. Therefore, the interior of the base is contaminated, and dust adheres on the electric circuit components in the base, causing troubles to the extension device.

In modem portable computers emphasizing the reduction of the thickness of the housing, the circuit board and the circuit components are densely packaged in the housing, making it difficult to maintain space for accommodating a fan and a heat sink. Therefore the sizes of the fan and the heat sink are decreased, making it difficult to sufficiently enhance the cooling performance of the MPU.

In particular, when the extension device is connected to the portable computer to let the MPU execute complex arithmetic processings, the MPU generates heat in correspondingly increased amounts. With the existing small fan and heat sink, therefore, it is difficult to obtain cooling performance that meets the amount of heat generated by the MPU, and the MPU is cooled insufficiently.

As a result, the temperature of the MPU exceeds an operation guarantee level, creating problems such as a delay in the processing speed and malfunctioning, and making it no longer possible to obtain maximum performance of the MPU.

It is an object of the present invention to provide an electronic equipment system capable of preventing troubles that may result from the infiltration of foreign matter yet maintaining cooling performance for the electronic equipment, and an extension device for expanding the functions of the electronic equipment.

It is an object of the present invention to provide an electronic equipment system capable of efficiently cooling the electronic equipment mounted on the mounting portion and of preventing the occurrence of troubles by suppressing the suction of dust and dirt as much as possible.

It is an object of the present invention to provide an electronic equipment system capable of efficiently cooling the housing of the electronic equipment and the heat-generating body by utilizing an extension device and of obtaining performance of the electronic equipment to a sufficient degree, and the extension device for expanding the functions of the electronic equipment.

SUMMARY OF THE INVENTION

The present invention provides an electronic equipment system comprises an electronic device and an extension device. The extension device has a mounting portion on where the electronic device is detachably mounted. The extension device expands the functionality of the electronic device. The extension device includes a fan unit for cooling, an opening portion formed in said mounting portion, a bottom portion facing the opening portion, and a plurality of protrusions formed on the bottom portion, protruding toward said opening portion, and arranged spaced apart in a circumferential direction of the opening portion.

The fan unit is disposed on the inside of said opening portion and blows cooling air toward the electronic device mounted on said mounting portion. The plurality of protrusions is in an air flow path of said cooling air through said extension device to said fan unit and retains foreign matter between said plurality of protrusions during cooling air flow.

In another aspect of the present invention, an electronic equipment system comprises an electronic device having a bottom wall, and an extension device. The extension device includes a base having a mounting portion on which said electronic device is detachably mounted. The mounting portion has an exhaust port facing the bottom wall of said electronic device. A circuit is disposed in said base and expands the functions of said electronic device mounted on said mounting portion. A fan unit is disposed at said exhaust port to blow the cooling air toward the bottom wall of said electronic device. The base has a bottom portion facing said exhaust port with said fan unit sandwiched therebetween, and has a plurality of pole portions formed on the bottom portion thereof. The plurality of pole portions extends toward said fan unit and is arranged at a distance to surround said fan unit. The plurality of pole portions forms a foreign matter-trapping region under said fan unit.

The fan unit has a fan supported by said base at an attitude so that the axis of rotation of said fan is inclined by a predetermined angle with respect to a vertical line that passes through said exhaust port. The plurality of pole portions have heights corresponding to the inclination of said fan unit.

In another aspect of the present invention, the fan unit is disposed on the inside of the opening to blow the cooling air toward the electronic device mounted on said mounting portion, and said plurality of protrusions are arranged maintaining a distance so as to surround said fan unit. The base may have side walls continuous to the peripheral edges of the mounting portion, and the mounting portion has a groove-like air passage continuous to said opening portion, in which the air passage is opened in the side walls.

In yet another aspect of the present invention, an extension device comprises a base having a bottom wall and a mounting portion facing said bottom wall and on which an electronic device is detachably mounted, and an expansion device for expanding the functions of the electronic device in a state in which said electronic device is mounted on said mounting portion. The base includes a first opening portion formed in the mounting portion, a second opening portion formed in said bottom wall and facing the first opening portion, and a fan unit for cooling disposed between said first opening portion and said second opening portion.

The base may include a suction port is formed in the mounting portion of the base to suck the air through a gap between the mounting portion and the bottom wall of the housing.

The base of the extension device has side walls continuous to the peripheral edges of the mounting portion; and the mounting portion includes a groove-like exhaust passage communicated with the exhaust port and is opened in the side walls, and a seal to shut off the exhaust port and the exhaust passage along the gap upon contact with the bottom wall of the housing. The mounting portion may include a trench-shaped exhaust passage communicated between the exhaust port and an opening in side wall of the base of the extension device, and may also include a seal disposed along the mounting portion surrounding the trench-shaped exhaust passage to form a seal along the exhaust passage except at the opening in the side wall upon engagement of the bottom wall of the housing with the mounting portion.

In yet another aspect of the present invention, an electronic equipment system comprises an electronic device including a housing having a bottom wall in which a first communication port is formed. The system also includes an extension device having a mounting portion on which the housing of the electronic device is detachably mounted, and for expanding the functions of the electronic device. The extension device includes an opening portion formed in the mounting portion and facing the bottom wall of the housing, a fan unit for blowing the cooling air toward the opening portion, and a second communication port formed in the mounting portion and communicated with the first communication port of the housing.

The electronic device may include a circuit component disposed in the housing that generates heat during operation of the circuit component and the opening portion of the extension device is arranged at a position corresponding to the circuit component when the housing is mounted on the mounting portion. The mounting portion of the extension device has a seal which, upon mounting of the housing on the mounting portion, engages the bottom wall of the housing to air-tightly connect the first communication port and the second communication port together.

In yet another aspect of the present invention, the electronic device has a first connector hole formed in the bottom wall of the housing, a first expansion connector disposed on the inside of the first connector hole, and a first gap for blowing the air formed between the first expansion connector and an opening edge of the first connector hole. A second connector hole is formed in the mounting portion of the extension device facing the first connector hole. A second expansion connector is disposed on the inside of the second connector hole. The second expansion connector is electrically connected to the extension circuit and is detachably fitted to the first expansion connector, and a second gap for blowing the air is formed between the second expansion connector and an opening edge of the connector hole. The second gap is continuous to the first gap on the side of the housing when the housing is mounted on the mounting portion.

In yet another aspect of the present invention, the bottom wall of the housing has an introduction port formed at a position corresponding to the circuit component and a first communication port formed at a position separated away from the introduction port. The extension device includes an exhaust port formed in the mounting portion and facing the introduction port of the housing, a fan unit for blowing the cooling air toward the exhaust port, and a second communication port formed in the mounting portion and connected to the first communication port of the housing.

In yet another aspect of the present invention, an electronic equipment system comprises an electronic device having a bottom wall, and an extension device including a mounting portion on which the electronic device is detachably mounted. The mounting portion has a fan unit disposed therein for blowing cooling air toward the bottom wall of the electronic device. The mounting portion also has an exhaust passage between the fan unit and a side wall of the mounting portion for channeling cooling air from the fan unit along the bottom wall of the electronic device towards the side wall of the mounting portion. The fan unit having an axis of rotation that is inclined toward the side wall.

In yet another aspect of the present invention, an electronic equipment system comprises an electronic device having a housing in which a heat-generating device is accommodated, and an extension device detachably coupled to the housing of the electronic device and adds additional functions to the electronic device. The extension device includes a heat conductor thermally connected to the housing when the extension device is coupled to the housing of the electronic device.

The extension device may include a mounting portion on which the housing is detachably mounted. The housing may have a bottom wall that faces the mounting portion, a first heat sink thermally connected to the heat-generating body is supported by the bottom wall, and the heat conductor is contacted to the bottom wall of the housing near the heat-generating device. The heat conductor may have a second heat sink disposed on the mounting portion, and the second heat sink may have a heat-receiving portion contacting the bottom wall of the housing. An elastically deformable heat-conducting member may be interposed between the heat-receiving portion of the second heat sink and the bottom wall of the housing.

The heat conductor may have at least one metallic fitting protuberance that protrudes beyond the mounting portion, and the housing of the electronic device may be made of a metal and may have at least one recessed fitting portion to which the fitting protuberance is detachably fitted.

The heat conductor may include a heat pipe having a first portion protruding beyond the mounting portion and a second portion guided to the interior of the extension device, and a metallic pipe cover covering the first portion of the heat pipe,. The housing may have a recessed fitting portion to which the pipe cover is detachably fitted. The mounting portion of the extension device may have a passage through which the cooling air flows, and the heat conductor is disposed in the passage.

In yet another aspect of the present invention, an electronic equipment system comprises an electronic device including a heat-generating device and a housing accommodating a first heat sink that is thermally connected to the heat-generating device, and an extension device having a mounting portion on which the electronic device is detachably mounted and a unit body with a cooling air passage through which the cooling air flows formed in the mounting portion, the extension device providing additional functions to the electronic device. The unit body of the extension device has a second heat sink that is thermally connected to the housing when the housing of the electronic device is mounted on the mounting portion, and the second heat sink is disposed in the cooling air passage.

The second heat sink may have a plurality of heat-radiating fins exposed to the cooling air passage. The unit body may include a fan for blowing the cooling air into the cooling air passage.

In yet another aspect of the present invention, an electronic equipment system comprises an electronic device having a housing accommodating a first heat sink that is thermally connected to a heat-generating device in the housing, and an extension device including a mounting portion on which the electronic device is detachably mounted and a unit body with a cooling air passage through which the cooling air flows formed in the mounting portion. The extension device provides additional functions to the electronic device. The unit body of the extension device has a second heat sink that is thermally connected to the first heat sink penetrating through the housing when the housing of the electronic device is mounted on the mounting portion, and the second heat sink is disposed in the cooling air passage.

The unit body may include a fan for blowing the cooling air into the cooling air passage. The second heat sink may have a first portion that protrudes beyond the mounting portion and is detachably fitted to the first heat sink, and a second portion guided to the interior of the unit body. The first portion is exposed to the cooling air passage, and the second portion is facing the fan inside the unit body. The second heat sink may be a heat pipe, and a plurality of heat-radiating fins may be formed on at least either the first portion or the second portion of the heat pipe. The first portion of the heat pipe may be covered with a metallic pipe cover, and the cooling fins may be formed on an outer peripheral surface of the pipe cover. The first heat sink may have a recessed fitting portion to which the first portion of the second heat sink is detachably fitted. The second heat sink may have a heat-receiving portion that is brought into surface contact with the first heat sink.

In yet another aspect of the present invention, an extension device for adding desired expansion functions to an electronic device that has a housing accommodating a heat-generating device, comprises a unit body having a mounting portion on which the housing of the electronic device is detachably mounted, and a heat-conducting means that is thermally connected to the housing when the housing is mounted on the mounting portion of the unit body.

In yet another aspect of the present invention, an extension device for adding desired expansion functions to an electronic device that has a housing accommodating a heat-generating body and a first heat sink for promoting the radiation of heat of the heat-generating body, comprises a unit body having a mounting portion on which the housing is detachably mounted, the mounting portion having, formed therein, a cooling air passage through which the cooling air flows, and a second heat sink that is thermally connected to the first heat sink penetrating through the housing when the housing is mounted on the mounting portion of the unit body. The second heat sink is disposed in the cooling air passage.

BRIEF DESCRIPTION OF THE DRAWINGS

FIG. 32 is a cross sectional view showing a state in which the portable computer is mounted on the mounting face of the extension device according to a fourteenth embodiment of the present invention.

DESCRIPTION OF THE PREFERRED EMBODIMENTS

A first embodiment of the present invention is described below with reference to FIGS. 1 to 9 for a portable computer.

Figure 1:
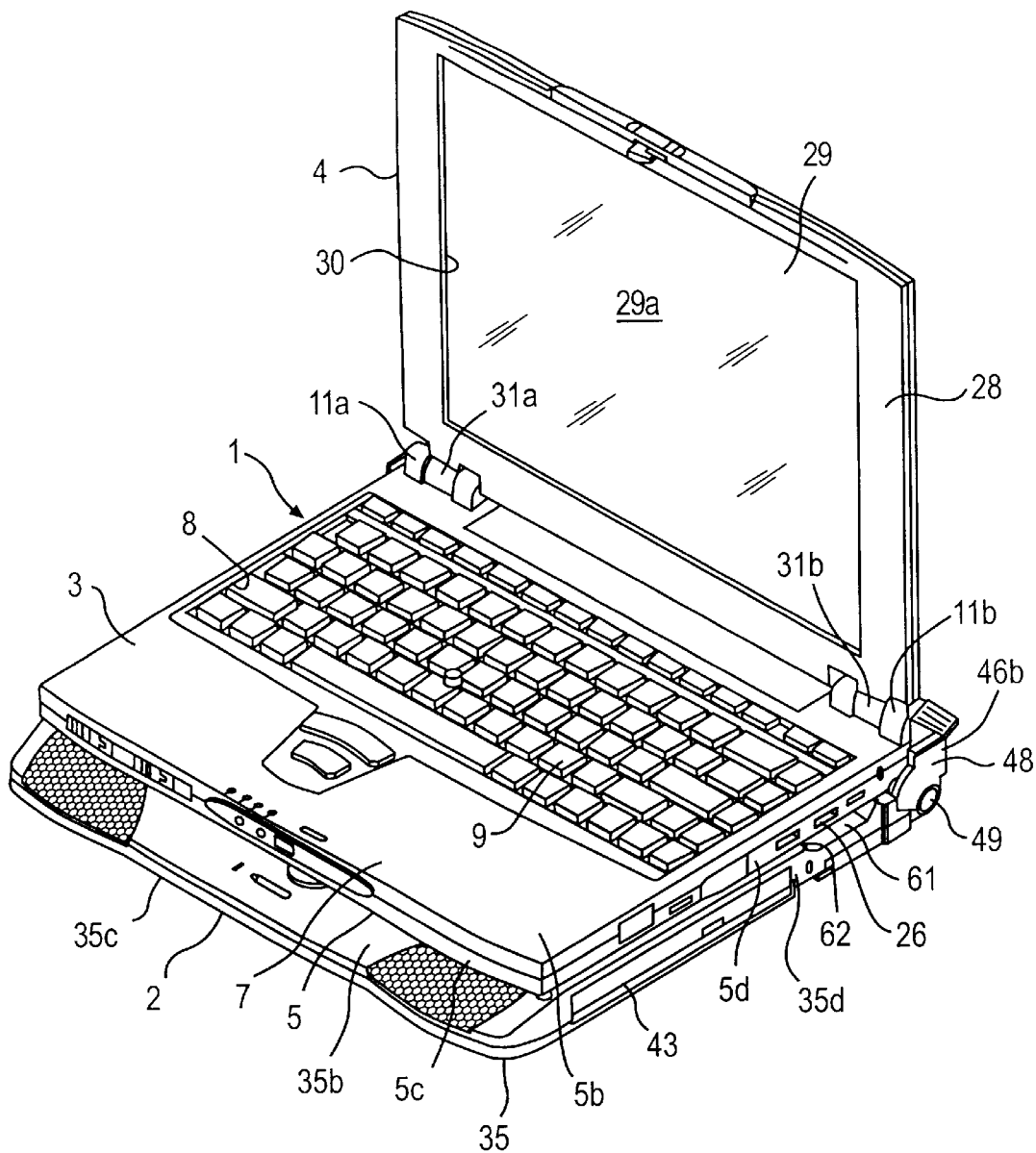
FIG. 1 is a perspective view showing a state in which a housing of a portable computer is mounted on the mounting face of an extension device according to a first embodiment of the present invention.
Figure 2:
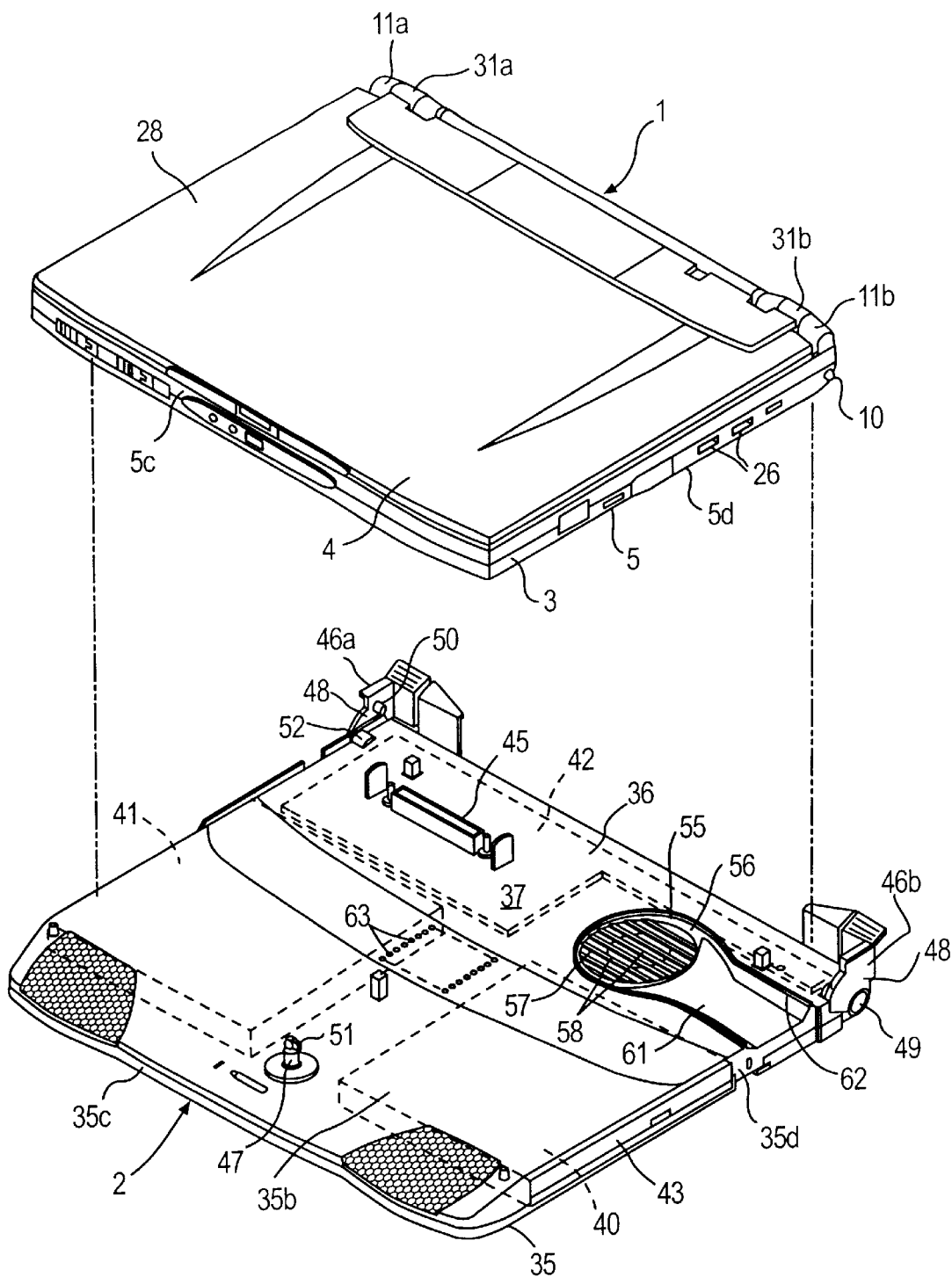
FIG. 2 is a perspective view showing a state in which the housing of the portable computer is removed from the mounting face of the extension device.
Figure 3:
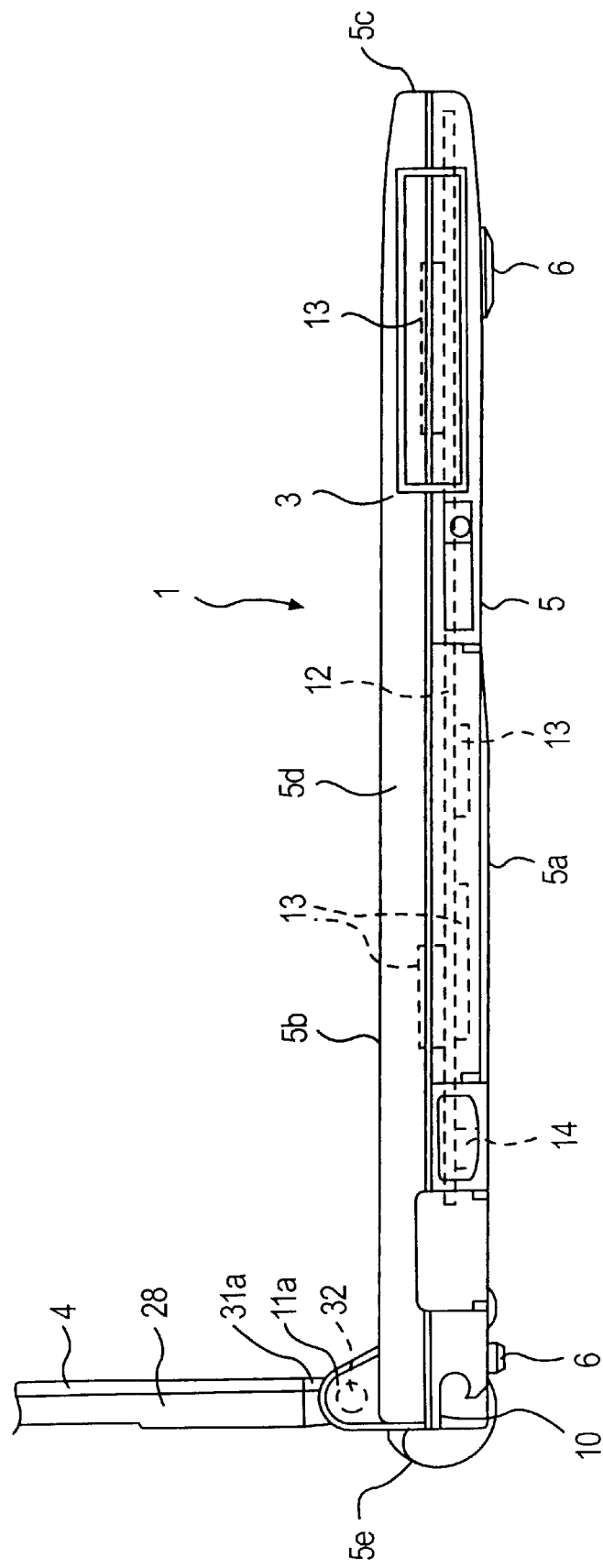
FIG. 3 is a side view showing the portable computer.

FIGS. 1 to 3 disclose a portable computer 1 acting as an electronic apparatus, and an extension device 2 to be used for extending the function of the portable computer 1.

The portable computer 1 comprises a computer body 3 and a display unit 4 mounted on the computer body 3. The computer body 3 has a housing 5 made of a magnesium alloy. The housing 5 has a bottom wall 5a, an upper wall 5b, a front wall 5c, right and left side walls 5d and a rear wall 5e. The housing 5 has a flat box shape with a thickness of about 20 mm, and preferably has a thickness less than that of a conventional general portable computer.

A plurality of seat portions 6 shown in FIG. 3. is mounted on a lower face of the bottom wall 5a of the housing 5. The seat portion 6 is protruded downward from the bottom wall 5a on four corners of the bottom wall 5a.

The upper wall 5b of the housing 5 has a palm rest 7 and a keyboard mounting section 8. The palm rest 7 extends in the direction of the width of the housing 5 in front of the upper wall 5b. The keyboard mounting section 8 is positioned behind the palm rest 7. The keyboard mounting section 8 is formed in a recessed portion which is recessed inward of the housing 5. A keyboard 9 is mounted in the keyboard mounting section 8.

An engagement portion 10 shown in FIGS. 2 and 3 is formed in the rear end portion of each of the right and left side walls 5d of the housing 5. The engagement portions 10 are used for connecting the portable computer 1 to the extension device 2, and is formed as a recessed portion opened sideward, downward and rearward in the housing 5. A pair of display support portions 11a and 11b protruding upward are formed in the rear end portion of the upper wall 5b of the housing 5. The display support portions 11a and 11b are spaced apart from each other behind the keyboard 9 in the direction of the width of the housing 5.

Figure 5:
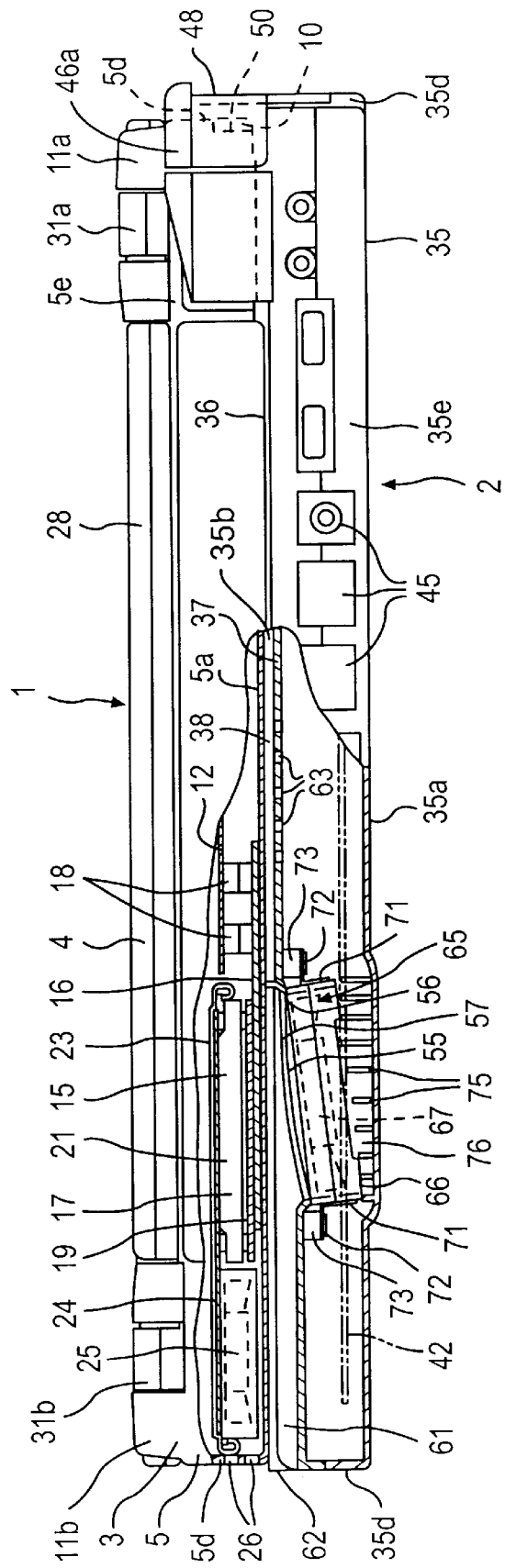
FIG. 5 is a rear view including a partial cross sectional view and showing the state in which the housing of the portable computer is mounted on the mounting face of the extension device.

As shown in FIGS. 3 and 5, a circuit board 12 is mounted in the housing 5, parallel to the bottom wall 5a of the housing 5. A plurality of circuit components 13, such as a semiconductor packages, is mounted on the upper and lower surfaces of the circuit board 12. A first extension connector 14 is mounted on the lower surface at the rear end portion of the circuit board 12. The first extension connector 14 is opposed to a connector leading port (not shown) which is opened in the bottom wall 5a of the housing 5 in the rear portion of the housing 5.

Figure 6:
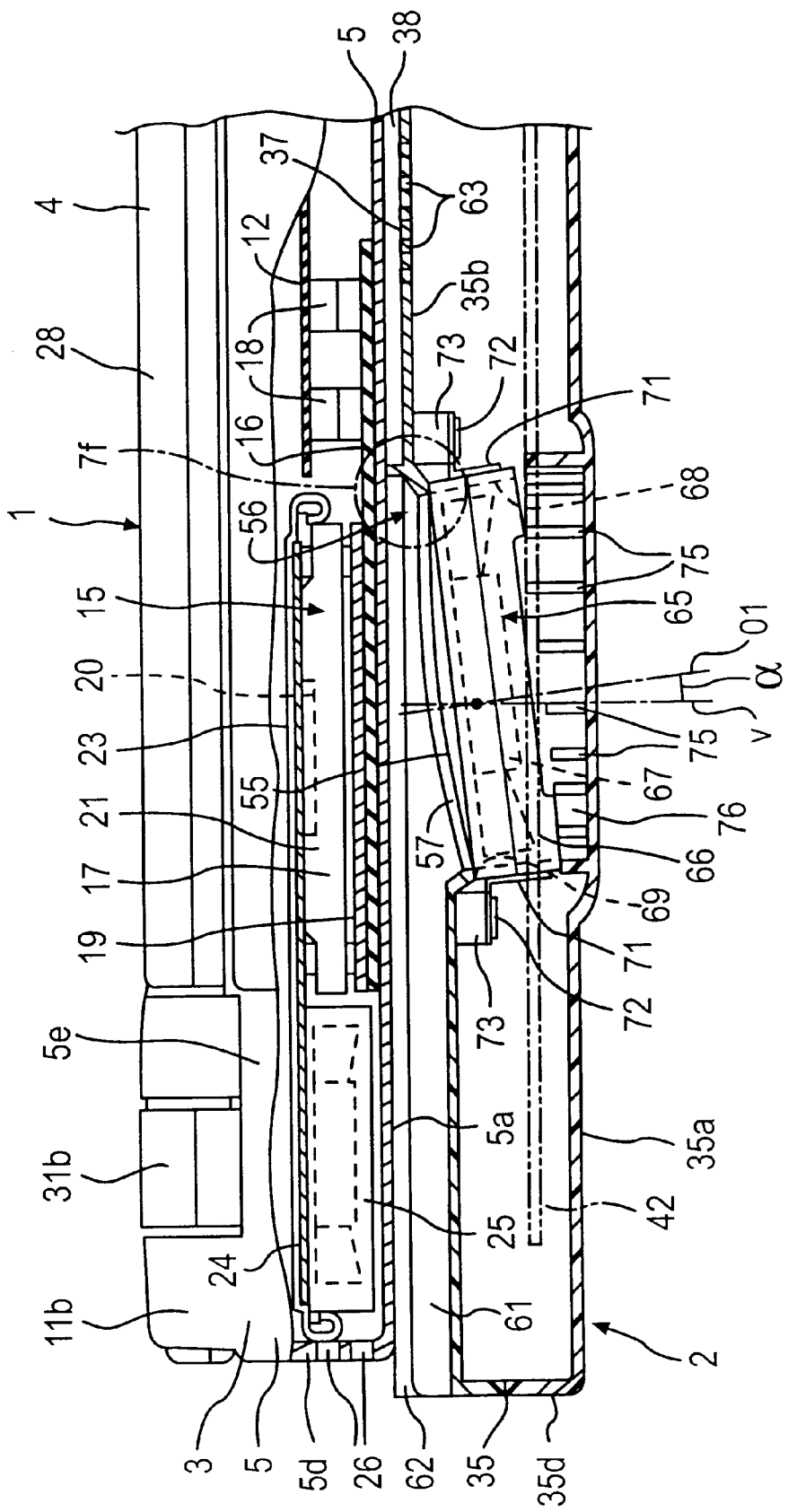
FIG. 6 is a cross sectional view showing the positional relationship between a fan unit of the extension device and an MPU in the state in which the housing of the portable computer is mounted on the mounting face of the extension device.

As shown in FIGS. 5 and 6, a circuit module 15 is mounted in the housing 5. The circuit module 15 comprises a module substrate 16 and an MPU (a microprocessing unit) 17 mounted on the module substrate 16. In order to reduce the thermal effect of the MPU 17 on an operator of the portable computer 1, the circuit module 15 is positioned on the right side of the rear portion of the housing 5 at a distance from the palm rest 7.

The module substrate 16 is disposed along the internal face of the bottom wall 5a of the housing 5. The module substrate 16 is electrically connected to the circuit board 12 through a pair of stacking connectors 18. In an alternate embodiment, the module substrate 16 may be disposed above the circuit board 12.

The MPU 17 is mounted on the upper face of the module substrate 16 through an MPU holder 19. The MPU 17 has an IC chip 20. The IC chip 20 consumes large amounts of power during operation in order to process various multimedia information such as characters, voices and images. Correspondingly, the IC chip 20 generates sufficient heat that cooling may be required. The IC chip 20 is housed in a flat metallic case 21. The case 21 is screwed to the upper face of the module substrate 16 through the MPU holder 19.

A first heat sink 23 is fixed to the upper face of the case 21 of the MPU 17 to thermally connect the first heat sink 23 to the IC chip 20. The first heat sink 23 is formed of a metal material with high heat conduction such as an aluminum alloy, and is flat plate-shaped. The first heat sink 23 has a fan fixing portion 24 projecting rightward from the MPU 17. A fan unit 25 is fixed to the lower face of the fan fixing portion 24. The fan unit 25 is positioned between the MPU 17 and the right side wall 5d of the housing 5. An exhaust port 26 communicating with the fan unit 25 is opened on the side wall 5d.

The display unit 4 comprises a flat box-shaped display housing 28, and a liquid crystal display 29 housed in the display housing 28. The display housing 28 has a front face on which a display opening 30 is formed. The liquid crystal display 29 has a display screen 29a on which characters, images and the like are displayed. The display screen 29a is exposed to the outside of the display housing 28 through the display opening 30.

The display housing 28 has a pair of leg portions 31a and 31b. The leg portions 31a and 31b are attacheed to the display support portions 11a and 11b of the housing 5, and are rotatably coupled to the housing 5 through a corresponding one of a plurality of hinge devices 32 shown in FIG. 3. Consequently, the display unit 4 can selectively be rotated between a closed position in which the display unit 4 covers the palm rest 7 and the keyboard 9 from above and an open position in which the palm rest 7, the keyboard 9 and the display screen 29a are exposed.

The extension device 2 usable for extending the function of the portable computer 1 includes a base 35 formed of a synthetic resin which is shown in FIGS. 2 and 3. The base 35 includes a bottom wall 35a, an upper wall 35b opposed to the bottom wall 35a, a front wall 35c connecting the bottom wall 35a and the upper wall 35b, right and left side walls 35d and a rear wall 35e. The base 35 is flat box-shaped, preferably with a thickness of about 20 millimeters.

Figure 9:
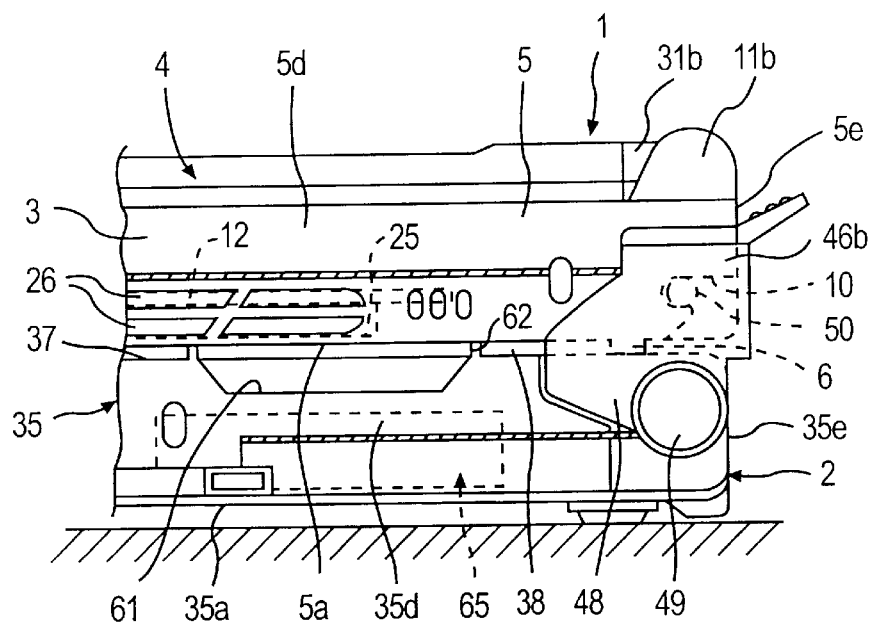
FIG. 9 is a side view showing the positional relationship between an exhaust passage of the extension device and the housing.

The base 35 has a mounting portion 36 on which the housing 5 of the portable computer 1 may be removably mounted, and is formed by the upper wall 35b of the base 35. The upper face of the upper wall 35b functions as a flat mounting face 37 opposed to the bottom wall 5a of the housing 5. The mounting face 37 preferably has a size corresponding to the size of the bottom wall 5a of the housing 5. In the state in which the housing 5 is mounted on the mounting face 37, the seat portion 6 of the bottom wall 5a of the housing 5 contacts the mounting face 37, and a gap 38 shown in FIGS. 6 and 9 is formed between the mounting face 37 and the bottom wall 5a of the housing 5.

A compact disk read-only memory (CD-ROM) drive 40, a floppy disk drive 41 and a circuit board 42 are housed in the base 35. The CD-ROM drive 40 and the floppy disk drive 41 provide extendibility of the function of the portable computer 1, and are arranged in the direction of the width of the base 35 in the front portion of the base 35. The CD-ROM drive 40 includes a tray 43 for supporting an optical disk (not shown). The tray 43 is exposed to the right side wall 35d of the base 35. The floppy disk drive 41 has a slot (not shown) for insertion and removal of a floppy disk (not shown). The slot is opened on the left side wall 35d of the base 35.

The circuit board 42 is disposed in parallel with the bottom wall 35a and the upper wall 35b in the rear portion of the base 35. The circuit board 42 is electrically connected to the CD-ROM drive 40 and the floppy disk drive 41 through a flexible wiring board (not shown). Circuit components (not shown) may be mounted on the upper and lower surfaces of the circuit board 42. A plurality of connectors 44 (shown in FIG. 5) for connecting peripheral equipment, such as a printer or an external keyboard, is mounted on the upper face of the circuit board 42. The connector 44 is exposed outside the base 35 through the rear wall 35e of the base 35.

A second extension connector 45 is mounted on the upper surface of the circuit board 42. The second extension connector 45 corresponds to the first extension connector 14 of the portable computer 1, and extends through the mounting face 36 and protrudes upward. Consequently, when the housing 5 of the portable computer 1 is mounted in a predetermined position on the mounting face 37, the first extension connector 14 is fitted in the second extension connector 45. Also, the portable computer 1 and the extension device 2 are electrically connected to each other through the extension connectors 14 and 45.

Figure 4:
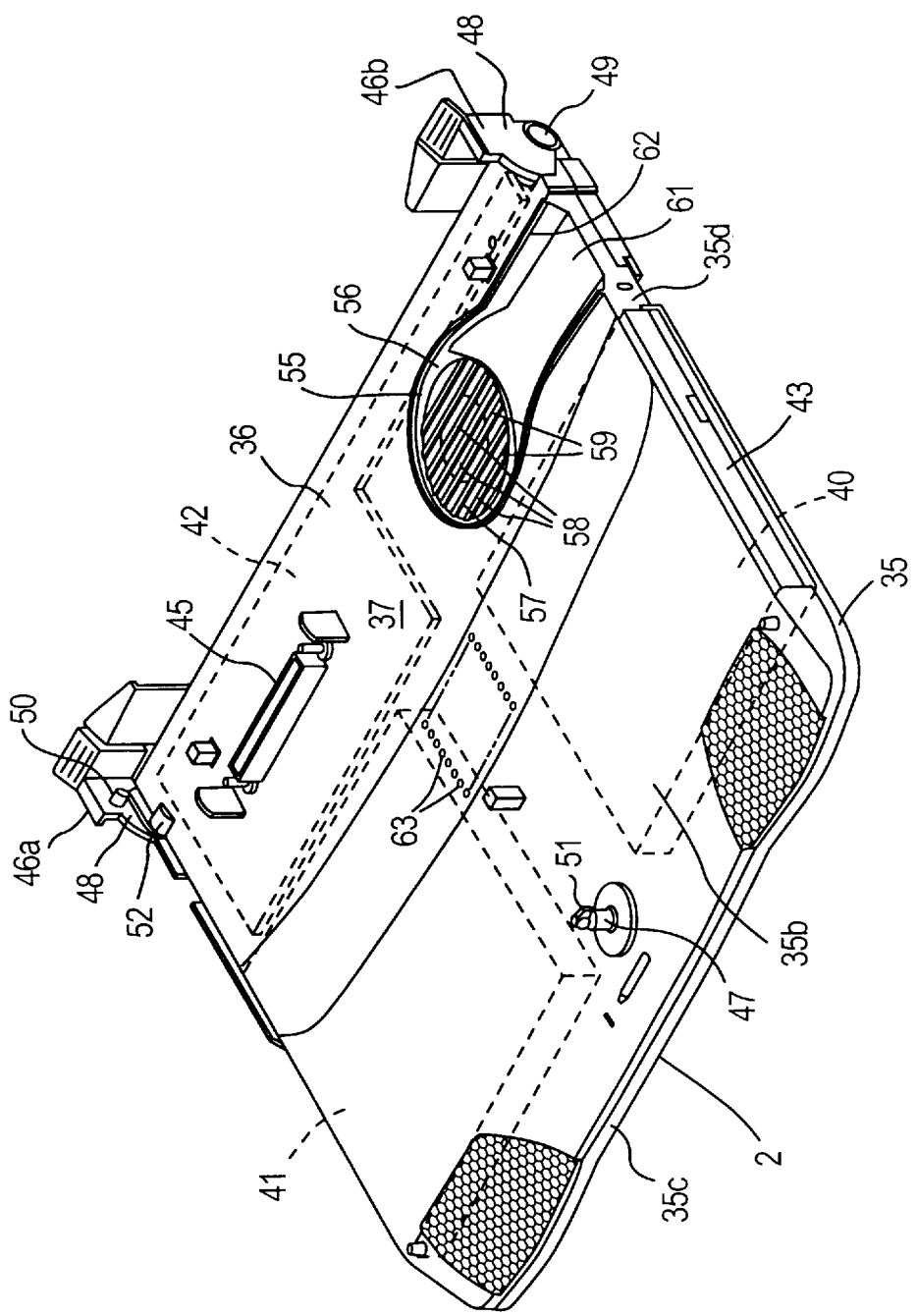
FIG. 4 is a perspective view showing the extension device.

As shown in FIGS. 2 and 4, the base 35 comprises a pair of rear hook levers 46a and 46b and a front hook 47 for locking the housing 5 of the portable computer 1 to the mounting face 37. The rear hook levers 46a and 46b are disposed spaced apart from each other in the direction of the width of the base 35 in the rear end portion of the base 35. The rear hook levers 46a and 46b have a lever body 48, respectively. The lever body 48 is rotatably supported on the rear end portion of the base 35 by a pivot shaft 49. The lever body 48 overlaps the side wall 35d of the base 35, and the upper portion of the lever body 48 projects upward from the mounting face 37. Consequently, when the housing 5 of the portable computer 1 is mounted on the mounting face 37, the upper portion of the lever body 48 is opposite to the side wall 5d of the housing 5.

A lock pin 50 is attached to the upper portion of a side face of the lever body 48. The lock pin 50 removably engages the engagement portion 10 of the housing 5, and horizontally projects onto the mounting face 37 of the base 35. Consequently, the lever body 48 is rotatable over an engagement position where the lock pin 50 is fitted in the engagement portion 10 and a release position where the lock pin 50 is removed toward a portion behind the engagement portion 10, and is constantly rotated and urged toward the engagement position through a torsion coil spring (not shown).

A front hook 47 is positioned in a central portion in the direction of the width of the mounting face 37 in the front end portion of the mounting face 37. The front hook 47 has a shaft shape and axially extends in a vertical direction. A pawl portion 51 is formed on the upper end of the front hook 47. The front hook 47 is supported on the base 35 in such a manner that the front hook 47 moves up and down in the vertical direction and can be rotated within a range of an angle of about 90 degrees in an axial direction.

Accordingly, the front hook 47 can be moved between a release position where most of the front hook 47 including the pawl portion 51 protrudes above the mounting face 37 and an engagement position where only the pawl portion 51 is positioned on the mounting face 37. The front hook 47 is constantly urged toward the release position by a spring (not shown).

When the housing 5 of the portable computer 1 is mounted in a predetermined position on the mounting face 37, the engagement portion 10 of the housing 5 contacts the lock pin 50 of the rear hook levers 46a and 46b and the bottom wall 5a of the housing 5 contacts the upper end of the front hook 47. By this contact, the rear hook levers 46a and 46b are rotated from the engagement position toward the release position in such a manner that the lever body 48 remains apart from the engagement portion 10, and then returns to the engagement position by the urging force of the spring so that the lock pin 50 removably engages the engagement portion 10 of the housing 5 as shown in FIG. 9.

Consequently, the housing 5 of the portable computer 1 is locked onto the mounting face 37 in a total of three places, that is, two places at the rear end and one place at the front end so that the engagement state of the first extension connector 14 with the second extension connector 44 is retained.

The lever body 48 of the rear hook levers 46a and 46b includes an eject roller 52. The eject roller 52 is opposite the bottom wall 5a of the housing 5 as long as the lever body 48 is rotated in the engagement position. For this reason, when the lever body 48 is moved from the engagement position to the release position, the lock pin 50 is removed from the engagement portion 10 of the housing 5 and then the eject roller 52 directly contacts the bottom wall 5a of the housing 5 to push up the housing 5 apart from the mounting face 37. As a result, the locking of the housing 5 with the lock pin 50 is released and the fitting of the first extension connector 14 and the second extension connector 44 is released so that the portable computer 1 can be moved away from the mounting face 37.

As shown in FIGS. 4 to 6, the mounting face 37 of the base 35 has a circular recessed portion 55. The recessed portion 55 is formed in a position inclined to the right from the central portion in the direction of the width in the rear portion of the mounting face 37. Consequently, when the housing 5 is mounted on the mounting face 37, the recessed portion 55 is positioned just below the MPU 17 housed in the housing 5.

Figure 8:
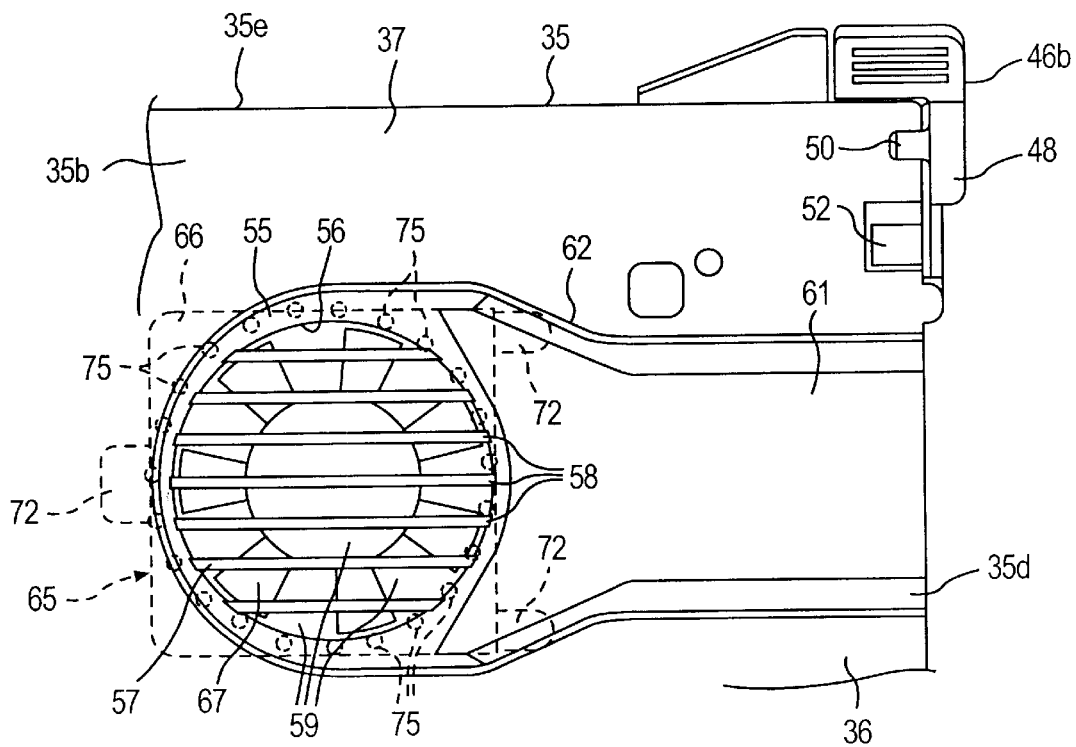
FIG. 8 is a plan view showing a portion including an exhaust port of the extension device.

The bottom of the recessed portion 55 is inclined downwardly towards the right side of the base 35. A circular exhaust port 56 is formed as an opening on the bottom of the recessed portion 55. The exhaust port 56 is opposed to the bottom wall 5a of the housing 5 and communicates with the inside of the base 35 when the housing 5 is mounted on the mounting face 37. A guard 57 is mounted in the recessed portion for preventing foreign matters from entering the exhaust port 56. The guard 57 has a plurality of bridges 58 extending in the radial direction of the exhaust port 56 as shown in FIG. 8. The bridges 58 are arranged in parallel with each other at spaced apart intervals. A plurality of clearances 59 for allowing the passage of air blown by a fan 67 is formed between the adjacent bridges 58.

A trench-shaped exhaust passage 61 is formed on the mounting face 37 of the base 35. The exhaust passage 61 extends in the direction of the width of the mounting face 37. The upstream end of the exhaust passage 61 communicates with the bottom of the recessed portion 55, and the downstream end of the exhaust passage 61 is opened in the upper portion of the right side wall 35d of the base 35.

Figure 7:
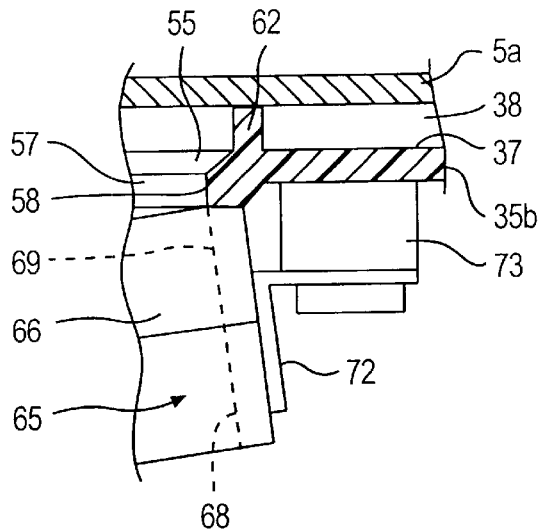
FIG. 7 is an enlarged cross sectional view showing convex portion 7F shown in FIG. 6.

As shown in FIGS. 7 and 8, a rib-shaped convex portion 62 is integrally formed as a shielding member in the edge portion of the exhaust passage 61 communicating with the mounting face 37 and the opening edge portion of the recessed portion 55. The convex portion 62 is protruded upward from the mounting face 37. The convex portion 62 is provided to continuously surround the opening edge portion of the recessed portion 55 and the edge portion of the exhaust passage 61 over the mounting face 37, and has an end portion reaching the right side wall 5d of the housing 5. The tip of the convex portion 62 contacts the bottom wall 5a of the housing 5 when the housing 5 is mounted on the mounting face 37. By this contact, the gap 38 formed on the mounting face 32 and the exhaust passage 61 and exhaust port 56 are spaced apart from each other without communication.

A large number of suction ports 63 are formed in almost the central portion in the directions of the width and length of the mounting face 37. The suction ports 63 are arranged in a matrix near the central portion of the mounting face 37. The suction ports 63 are connected with the inside of the base 35, and are opened in the gap 38 between the mounting face 37 and the housing 5 when the housing 5 is mounted on the mounting face 37.

As shown in FIGS. 5, 6 and 8, a motor type fan unit 65 is disposed in the base 35. The fan unit 65 comprises a fan casing 66 and a fan 67 supported on the central portion of the fan casing 66. The fan casing 66 has a flat and square frame shape with four corners. The fan casing 66 has a suction port 68 and an exhaust port 69 which are opposed to each other with the fan 67 interposed therebetween.

A bracket 71 is attached to the outer peripheral portion of the fan casing 66. The bracket 71 has a plurality of support pieces 72 opposed to the internal face of the upper wall 35b of the base 35. A plurality of mounting seats 63 extending downward is formed on the internal face of the upper wall 35b. A mounting seat 73 is disposed around the exhaust port 56. The support piece 72 of the bracket 71 is attached to the lower face of the mounting seat 73 by screws, for example.

Accordingly, the fan unit 65 is fixed to the upper wall 35b of the base 35 in a horizontal position where the exhaust port 69 is directed to the exhaust port 56. The suction port 68 of the fan unit 65 is opposed to the bottom wall 35a of the base 35. As a result, when the fan 67 is rotated, the air in the base 35 is sucked through the suction port 68. The air is discharged upward from the exhaust port 69 toward the exhaust port 56.

In one embodiment of the present invention, the fan 67 is driven if the temperature of the IC chip 20 of the MPU 17 equals or exceeds a predetermined value.

As shown in FIG. 6, the fan unit 65 has a rotary axis O1 passing through the center of the rotation of the fan 67. The fan unit 65 is mounted in a position where the rotary axis O1 is inclined at a predetermined angle α with a vertical line V passing through the exhaust port 56. The direction of the inclination of the fan unit 65 is coincident with the direction of the inclination of the bottom of the recessed portion 55.

A plurality of column-shaped convex portions 75 is formed on the inside surface of the bottom wall 35a of the base 35 in a portion which is opposed to the fan unit 65. The convex portions 75 extend from the bottom wall 35a of the base 35 toward the fan casing 66. The convex portions 75 are arranged at intervals in the circumferential direction of the suction port 68 of the fan casing 66 to surround the suction port 68. The heights of the convex portions 75 are selected to match the inclination of the fan casing 66. The convex portion 75 forms a foreign matter capturing region 76 on the inside of the base 35 in cooperation with the fan casing 66. The foreign matter capturing region 76 is positioned just below the exhaust port 56.

With such a structure, when the function of the portable computer 1 is to be extended, the housing 5 of the portable computer 1 is first mounted on the mounting face 37 of the extension device 2 and the housing 5 is locked onto the mounting face 37 through the rear hook levers 46a and 46b and the front hook 47. Consequently, the first extension connector 14 of the housing 5 is fitted in the second extension connector 44 of the extension device 2, and the portable computer 1, the CD-ROM drive 40 and the floppy disk drive 41 are electrically connected with one another through the first and second extension connectors 14 and 44.

When the housing 5 of the portable computer 1 is locked onto the mounting face 37 of the base 35, the bottom wall 5a of the housing 5 is opposed to the mounting face 37 and a gap 38 is formed between the bottom wall 5a and the mounting face 37.

In the process in which the portable computer 1 is connected to the extension device 2, when the fan unit 65 of the extension device 2 is driven with an increase in the temperature of the MPU 17, the air in the base 35 is sucked through the suction port 68 and a negative pressure acts on the suction ports 68 to draw air through the base 35. The air is blown off over the mounting face 37 from the exhaust port 69 through the exhaust port 56 by the rotation of the fan 67 and becomes cooling air to be directly sprayed onto the bottom wall 5a of the housing 5. The cooling air flows along the exhaust passage 61, and is then discharged from the downstream end of the exhaust passage 61 toward the right side of the base 35.

In this case, the exhaust port 56 disposed on the mounting face 37 is positioned below the MPU 17 which generates heat. Therefore, the bottom wall 5a of the housing 5 which receives the thermal effect of the MPU 17 is cooled by a forced convection using the air as a medium. Consequently, the heat of the MPU 17 which is transferred to the bottom wall 5a can be efficiently discharged toward the outside of the housing 5.

In addition, the fan unit 65 is mounted at an orientation where the rotary axis O1 of the fan 67 is inclined at a predetermined angle with respect to a vertical line V and in the direction of the exhaust passage 61. Therefore, the air stream blown onto the bottom wall 5a of the housing 5 is directed towards the exhaust passage 61. Hence, the air stream blown from the fan unit 65 does not collide with the bottom wall 5a of the housing 5 at a right angle but is smoothly guided toward the exhaust passage 61 without generating a vortex near the exhaust port 56.

Consequently, the flow resistance of the air blown onto the bottom wall 5a of the housing 5 is reduced. Correspondingly, the amount of the air that is being blown is increased so that the cooling efficiency of the housing 5 can be increased.

On the other hand, when the air in the base 35 is sucked with the driving of the fan unit 65, a negative pressure is applied to the suction port 63 of the mounting face 37. Since the suction port 63 is opened in the gap 38 between the mounting face 37 and the bottom wall 5a of the housing 5 in almost the central portion of the mounting face 37, it sucks the air through the gap 38. Consequently, an air flow sent from the peripheral edge portion of the mounting face 37 toward the central suction port 63 is formed in the gap 38 between the mounting face 37 and the bottom wall 5a as shown by an arrow in FIG. 5. The air flows along the bottom wall 5a of the housing 5. Therefore, the wide range of the bottom wall 5a of the housing 5 contacts the air flow sent toward the suction port 63.

Accordingly, the bottom wall 5a of the housing 5 can be cooled by utilizing the air sucked into the suction port 63. The cooling air is directly sprayed onto the portion of the bottom wall 5a which is opposed to the exhaust port 56. In addition, all the corners of the bottom wall 5a of the housing 5 can be cooled. Correspondingly, it is possible to increase the cooling effects of the housing 5 and furthermore the MPU 17.

Moreover, a rib-shaped convex portion 62 for continuously surrounding the exhaust port 56 and the exhaust passage 61 is formed on the mounting face 37. The tip of the convex portion 62 contacts the bottom wall 5a of the housing 5 mounted on the mounting face 37. Therefore, the communication of the gap 38 with the exhaust port 56 and the exhaust passage 61 by the convex portion 62 is shut off.

For this reason, the flow of the cooling air led from the exhaust port 56 to the exhaust passage 61 and the air flow on the suction side which turns toward the suction port 63 in the gap 38 do not interfere with each other. Consequently, the smooth air flow can be obtained in the gap 38.

According to the above-mentioned structure, the suction port 63 of the base 35 is opened on the mounting face 37.

Therefore, when the extension device 2 is mounted on the board of a desk during use, for example, the opening position of the suction port 63 is raised with respect to the board. Consequently, even if a negative pressure is applied to the suction port 63 with the driving of the fan unit 65, dust on the board is sucked with difficulty.

Accordingly, it is possible to inhibit the dust from entering the base 35 and from sticking to the circuit board 42 as much as possible. Thus, the malfunctions and troubles of the extension device 2 can be reduced.

When the portable computer 1 is removed from the mounting surface 37 of the expansion device 2 by turning the rear hook levers 46a and 46b from the engaging positions to the disengaging positions, the exhaust port 56 in the mounting surface 37 is directly exposed to the outer side of the base 35. Therefore, if the user accidentally lets foreign matter such as a clip or a staple of a stapler fall on the mounting surface 37, such foreign matter enters into the exhaust port 56 through the bridges 58 of the guide 57 and may fall into the interior of the base 35 passing through the exhaust port 56, exhaust port 69 of the fan casing 66 and the suction port 68.

According to the expansion device 2 constituted as described above, however, the convex portions 75 are formed on the inner surface of the bottom wall 35a of the base 35 of a portion facing the fan unit 65 in order to constitute a foreign matter-trapping region 76 just under the exhaust port 56 in cooperation with the fan casing 66.

Therefore, even if foreign matter enters into the exhaust port 56, foreign matter falls on the foreign matter-trapping region 76 surrounded by the convex portions 75 and is caught by the convex portions 75 and stays in the foreign matter-trapping region 76. Therefore, unless the expansion device 2 is shaken or tilted, foreign matter which has fallen into the base 35 does not enter into the space where the circuit board 42 or any other electric parts are accommodated, preventing the short-circuiting or malfunctioning of the expansion device 2 that stem from foreign matter. Furthermore, since the air-blow passages are formed among the neighboring. convex portions 75, the cooling air heading in the base 35 toward the suction port 68 of the fan unit 65 flows passing through the air-blow passages, and the air stream in the base 35 is not blocked by the protrusions.

Additionally, foreign matter that has fallen on the exhaust port 56 stays in the foreign matter-trapping region 76 just under the exhaust port 56. Therefore, there is no need to narrow the distance among the bridges 58 of the guard 57 or to decrease the diameter of the exhaust port 56 so that foreign matter will not enter into the exhaust port 56. It is therefore allowed to substantially fully maintain the area of the exhaust port 56 and to suppress the resistance of the air flow blown from the exhaust port 56.

Thus, the cooling air can be blown in an amount which is not too small or not too large to the housing 5 mounted on the mounting surface 37, and the housing maintains favorable cooling performance while preventing foreign matter from diffusing into the base 35.

Alternatively, a through hole (not shown) may be formed as a second opening portion in the bottom wall 35a of the base 35. The through hole faces the exhaust port 56 with the fan unit 65 being sandwiched therebetween and is continuous to the foreign matter-trapping region 76. In a state where the expansion device 2 is used mounted on the top board of a desk, the through hole is closed by the top board.

In forming the through hole in the bottom wall 35a, it is desired to form a guard 57 having bridges 58 similar to that of the exhaust port 56 in the through hole.

According to this constitution in which the through hole continuous to the foreign matter-trapping region 76 is formed in the bottom wall 35a of the base 35, the foreign matter-trapping region 76 is opened downwards through the hole when the expansion device 2 is lifted up from the desk. It is therefore allowed to easily take foreign matter that has fallen on the foreign matter-trapping region 76 out of the base 35 through the hole without disassembling the base 35.

Foreign matter that cannot be taken out through the hole stays in the foreign matter-trapping region 76 due to the presence of the convex portions 75; i.e., foreign matter does not move into space where the circuit board 42 and other electric parts are accommodated, and thus not causing short-circuiting or malfunctioning of the expansion device 2.

In the above-mentioned embodiment, the fan unit was disposed at the exhaust port. According to the present invention, however, the fan unit may be disposed in the base separated away from the exhaust port or near the suction holes without necessarily limited thereto only.

In the above-mentioned embodiment, furthermore, the opening portion on the mounting surface was used as the exhaust port, and the cooling air was exhaust therefrom. Depending upon the situation, however, the above-mentioned opening portion may be used as the suction port, and the cooling air may be sucked therefrom.

Figure 10:
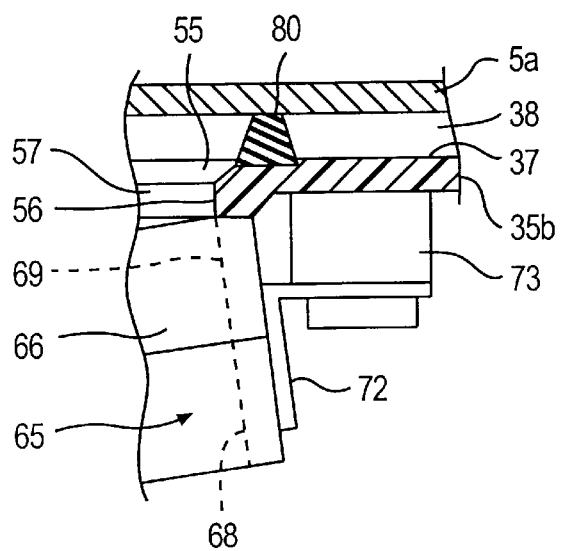
FIG. 10 is a cross sectional view showing the positional relationship between the exhaust port of the extension device and the bottom wall of the housing according to a second embodiment of the present invention.

Although the rib-shaped convex portion 62 which is in contact with the bottom wall 5a of the housing 5 has been formed on the mounting face 37 of the base 35 so that the communication of the gap 38 for air suction with the exhaust passage 61 has been shut off in the first embodiment, the present invention is not restricted thereto. FIG. 10 shows a second embodiment of the present invention.

In the second embodiment, a seal member 80 for surrounding a recessed portion 55 and an exhaust passage 61 is fixed to a mounting face 37 of a base 35 by adhesion, fitting or the like. The seal member 80 is formed of a rubber-like elastic body which can be deformed elastically, and protrudes upward from the mounting face 37.

Accordingly, when a housing 5 of a portable computer 1 is mounted on the mounting face 37, the tip of the seal member 80 elastically contacts a bottom wall 5a of the housing 5. By this contact, the gap 38 for air suction and the exhaust passage 61 can be shut off with airtightness.

According to such a structure, the seal member 80 can be deformed elastically. Therefore, the tip of the seal member 80 comes in contact with the bottom wall 5a of the housing 5 without clearance so that the gap 38 can be separated from the exhaust passage 61 with airtightness.

Additionally, even if a dimensional error is made on the housing 5 and the base 35, the elastic deformation of the seal member 80 can absorb the dimensional error. Consequently, it is possible to prevent the housing 5 mounted on the mounting face 37 from being shaken or inclined. Thus, the position of the housing 5 on the mounting face 37 can be stabilized.

Figure 11:
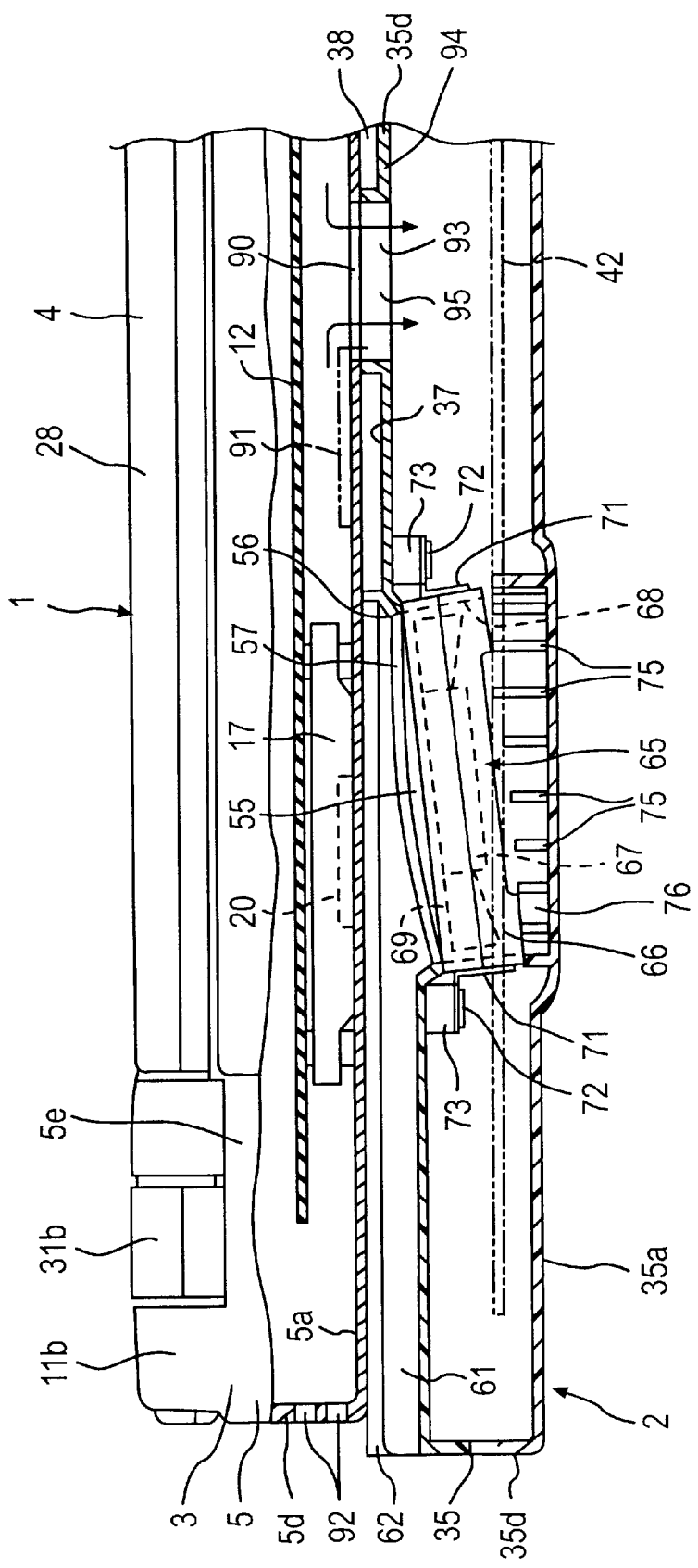
FIG. 11 is a cross sectional view showing a state in which the housing of the portable computer is mounted on the mounting face of the extension device according to a third embodiment of the present invention.

FIG. 11 discloses a third embodiment of the present invention.

In the third embodiment, an air suction passage reaching the inside of a base 35 is different from that in the first embodiment, and the basic structures of a portable computer 1 and an extension device 2 are the same as those in the first embodiment. In the third embodiment, therefore, the same components as those in the first embodiment have the same reference numerals and their description is omitted.

As shown in FIG. 11, an MPU 17 is mounted on the lower face of a circuit board 12 housed in a housing 5. The MPU 17 is disposed between the circuit board 12 and a bottom wall 5a of the housing 5. An IC chip 20 of the MPU 17 is opposed to the bottom wall 5a. The heat of the IC chip 20 is positively transferred to the bottom wall 5a.

A first communicating port 90 is formed on the bottom wall 5a of the housing 5. The first communicating port 90 is connected to the inside of the housing 5 in the central portion of the bottom wall 5a. A slide type shutter 91 is supported on the bottom wall 5a of the housing 5. The shutter 91 can artificially slide over a first position where the first communicating port 90 is closed and a second position where the first communicating port 90 is opened. FIG. 11 shows a state in which the shutter 91 is caused to slide to the second position.

A plurality of suction ports 92 is formed on a side wall 5d of the housing 5. The suction ports 92 are connected with the inside of the housing 5.

A second communicating port 93 is formed in almost the central portion of a mounting face 37 of a base 35. When the housing 5 of the portable computer 1 is mounted on the mounting face 37, the second communicating port 93 is opposed to the first communicating port 90 of the housing 5. A rib-shaped convex portion 94 is formed in the opening edge portion of the second communicating port 93. The convex portion 94 is continuously formed in the circumferential direction of the second communicating port 93 and protrudes upward from the mounting face 37. The tip of the convex portion 94 contacts the bottom wall 5a of the housing 5 and surrounds the first communicating port 90.

For this reason, the convex portion 94 forms an air suction passage 95 in cooperation with the first and second communicating ports 90 and 93. The air suction passage 95 is not opened on a gap 38 provided between the bottom wall 5a of the housing 5 and the mounting face 37 but connects the inside of the housing 5 to that of the base 35.

With such a structure, when the housing 5 is mounted on the mounting face 37 of the base 35, the inside of the base 35 communicates with that of the housing 5 through the first and second communicating ports 91 and 93. Consequently, if the air in the base 35 is sucked with the driving of the fan unit 65, a negative pressure is applied to the air suction passage 95 including the first and second communicating ports 91 and 93 so that the air in the housing 5 is sucked into the base 35.

Thus, a cooling air flow turning to the air suction passage 95 is formed in the housing 5 as shown by an arrow in FIG. 11. Consequently, air permeability can be enhanced in the housing 5 and the MPU 17 generating heat is directly cooled by a forced convection using the air as a medium.

The cooling air blown off from the exhaust port 56 of the base 35 is directly sprayed onto the bottom wall 5a of the housing 5 in the same manner as in the first embodiment. In this case, the heat of the IC chip 20 of the MPU 17 is transferred to the bottom wall 5a and the cooling air is sprayed onto the bottom wall 5a in a position corresponding to the MPU 17. Therefore, the heat transferred to the bottom wall 5a can be efficiently discharged toward the outside of the housing 5 together with the flow of the cooling air.

Accordingly, the MPU 17 in the housing 5 can be directly cooled by the cooling air and the cooling efficiency of the MPU 17 can be enhanced.

Furthermore, the air in the housing 5 mounted on the mounting face 37 is sucked into the base 35. Therefore, the fan unit 65 sucks dust on the board with difficulty. Consequently, it is possible to inhibit the dust from entering the inside of the base 35 and sticking to a circuit board 42 as much as possible. Thus, the malfunctions and troubles of the extension device 2 can be prevented.

While the convex portion 94 which contacts the bottom wall 5a of the housing 5 has been formed around the second communicating port 93 of the mounting face 37 in the third embodiment, a packing formed of a rubber-like elastic member which can be elastically deformed, for example, may be fixed in place of the convex portion 94 and the tip of the packing may be caused to elastically contact the bottom wall 5a of the housing 5.

According to this structure, the airtightness of the air suction passage 95 for connecting the first communicating port 90 to the second communicating port 93 can be enhanced so that the air in the housing 5 can be efficiently sucked.

Furthermore, a cover for opening and closing the second communicating port 93 may be provided on an upper wall 35b of the base 35 forming the mounting face 37 to prevent foreign matters from entering the inside of the base 35 through the second communicating port 93 when the housing 5 is removed from the mounting face 37.

Figure 12:
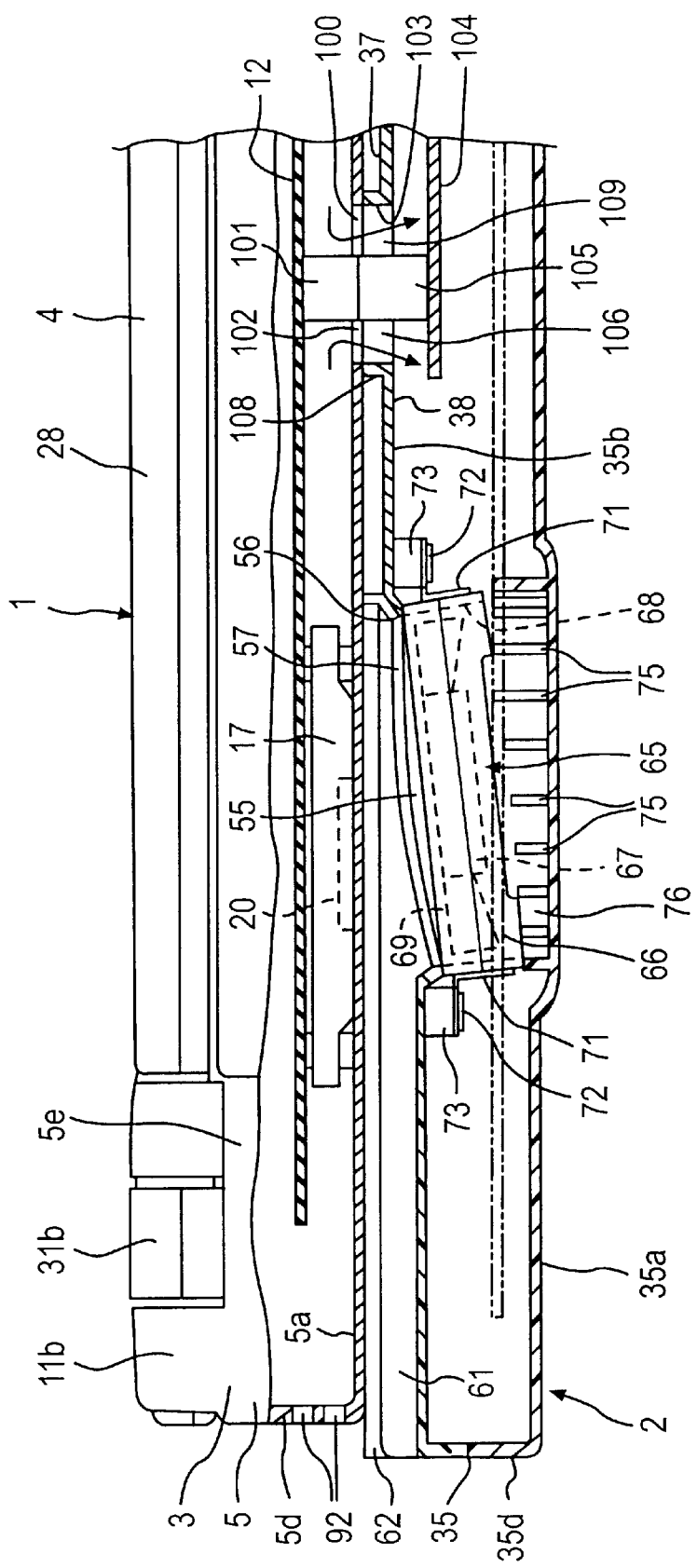
FIG. 12 is a cross sectional view showing a state in which the housing of the portable computer is mounted on the mounting face of the extension device according to a fourth embodiment of the present invention.

FIG. 12 discloses a fourth embodiment of the present invention.

The fourth embodiment is obtained by modification of the third embodiment. The basic structures of a portable computer 1 and an extension device 2 are the same as those in the third embodiment.

As shown in FIG. 12, a first connector hole 100 is formed in the central portion of a bottom wall 5a of a housing 5. The fist connector hole 100 is connected with the inside of the housing 5 and is opposed to the lower face of a circuit board 12 housed in the housing 5. A first extension connector 101 is mounted on the lower face of the circuit board 12. The first extension connector 101 faces the first connector hole 100, and a first clearance 102 for ventilation is formed between the outer peripheral face of the first extension connector 101 and the opening edge portion of the first connector hole 100.

A second connector hole 103 is formed in the central portion of a mounting face 37 of a base 35. The second connector hole 103 is connected with the inside of the base 35. The second connector hole 103 is opposed to the first connector hole 100 of the housing 5 when the housing 5 of the portable computer 1 is mounted on the mounting face 37.

A junction board 104 is housed in the base 35. The junction board 104 is disposed parallel to an upper wall 35b of the base 35, and a second extension connector 105 is mounted on the upper face of the junction board 104. The second extension connector 105 is removably fitted in the first extension connector 105, and faces the second connector hole 103. A second clearance 106 for ventilation is formed between the outer peripheral face of the second extension connector 105 and the opening edge portion of the second connector hole 103. The second clearance 106 is connected with the first clearance 102 on the inside of the first connector hole 100 when the housing 5 is mounted on the mounting face 37. The inside of the housing 5 and that of the base 35 communicate with each other through the clearances 102 and 106.

A rib-shaped convex portion 108 is formed in the opening edge portion of the second connector hole 103. The convex portion 108 is continuously formed in the circumferential direction of the second connector hole 103 and protrudes upward from the mounting face 37. The tip of the convex portion 108 contacts the bottom wall 5a of the housing 5 and surrounds the first connector hole 100.

For this reason, the convex portion 108 constitutes an air suction passage 109 in cooperation with the first and second connector holes 100 and 103. The air suction passage 109 is not opened on a gap 38 between the housing 5 and the mounting face 37 but connects the inside of the housing 5 to that of the base 35.

With such a structure, when the housing 5 is mounted on the mounting face 37 of the base 35, the first and second connector holes 100 and 103 are opposed to each other and the first and second extension connectors 101 and 105 are fitted each other through the connector holes 100 and 103. Consequently, the portable computer 1 is. electrically connected to the extension device 2, and the inside of the housing 5 communicates with that of the base 35 through the air suction passage 109.

For this reason, if the air in the base 35 is sucked with the driving of the fan unit 65, a negative pressure is applied to the air suction port 109 so that the air in the housing 5 is sucked into the base 35 as shown by an arrow in FIG. 12. As a result, a cooling air flow turning to the air suction passage 109 is formed in the housing 5. Consequently, air permeability can be enhanced in the housing 5 and the MPU 17 generating heat is directly cooled by a forced convection using the air as a medium.

According to this structure, therefore, the air in the housing 5 can be sucked into the base 35 by utilizing the first and second connector holes 100 and 103 exposing the first and second extension connectors 101 and 105. For this reason, it is not necessary to open a special hole for air suction on the bottom wall 5a of the housing 5 and the mounting face 37 of the base 35, and the structures of the housing 5 and the base 35 can be simplified.

While the convex portion 108 which contacts the bottom wall 5a of the housing 5 has been formed around the second connector hole 103 of the mounting face 37 in the fourth embodiment, a packing formed of a rubber-like elastic member which can be elastically deformed, for example, is fixed in place of the convex portion 108 and the tip of the packing may be caused to elastically contact the bottom wall 5a of the housing 5.

According to this structure, the airtightness of the air suction passage 109 for connecting the first connector hole 100 to the second connector hole 103 can be enhanced so that the air in the housing 5 can be sucked more efficiently.

Moreover, a cover for opening and closing the first connector hole 100 may be provided on the bottom wall 5a of the housing 5 and a cover for opening and closing the second connector hole 103 may be provided on the mounting face 37 of the base 35 to prevent foreign matters from entering the inside of the housing 5 and that of the base 35 when the housing 5 is removed from the mounting face 37 of the base 35.

Figure 13:
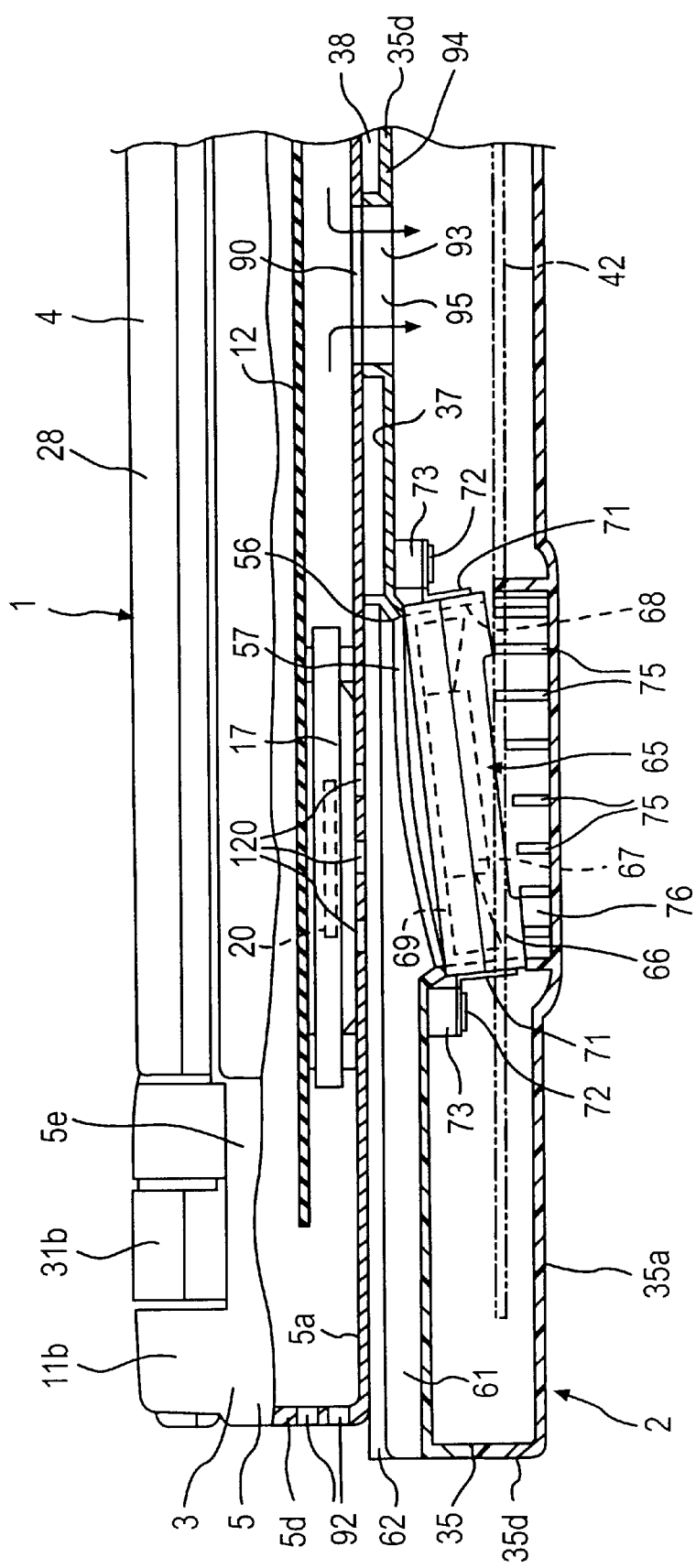
FIG. 13 is a cross sectional view showing a state in which the housing of the portable computer is mounted on the mounting face of the extension device according to a fifth embodiment of the present invention.
Figure 14:
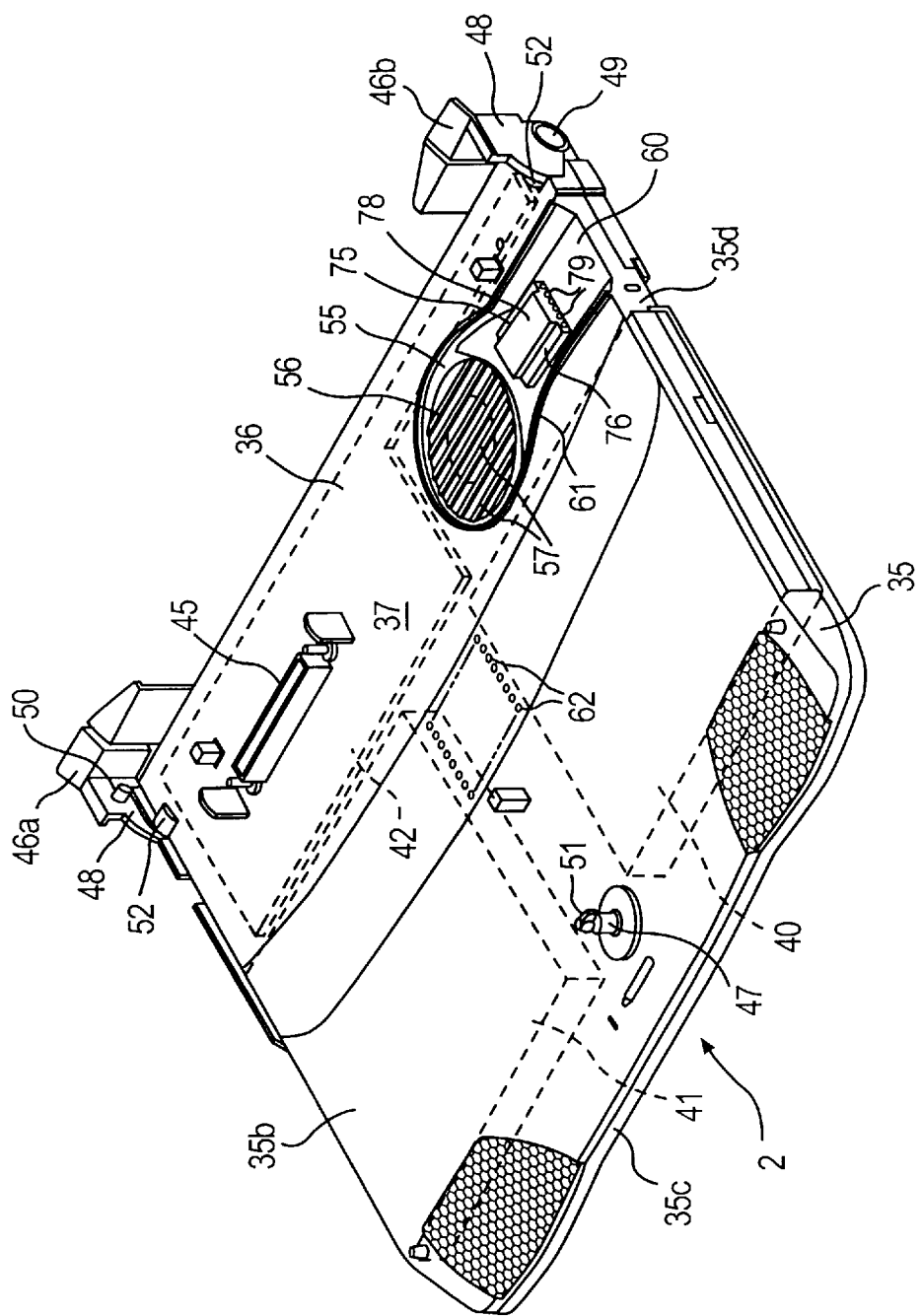
FIG. 14 is a perspective view showing an extension device according to a sixth embodiment of the present invention.
Figure 15:
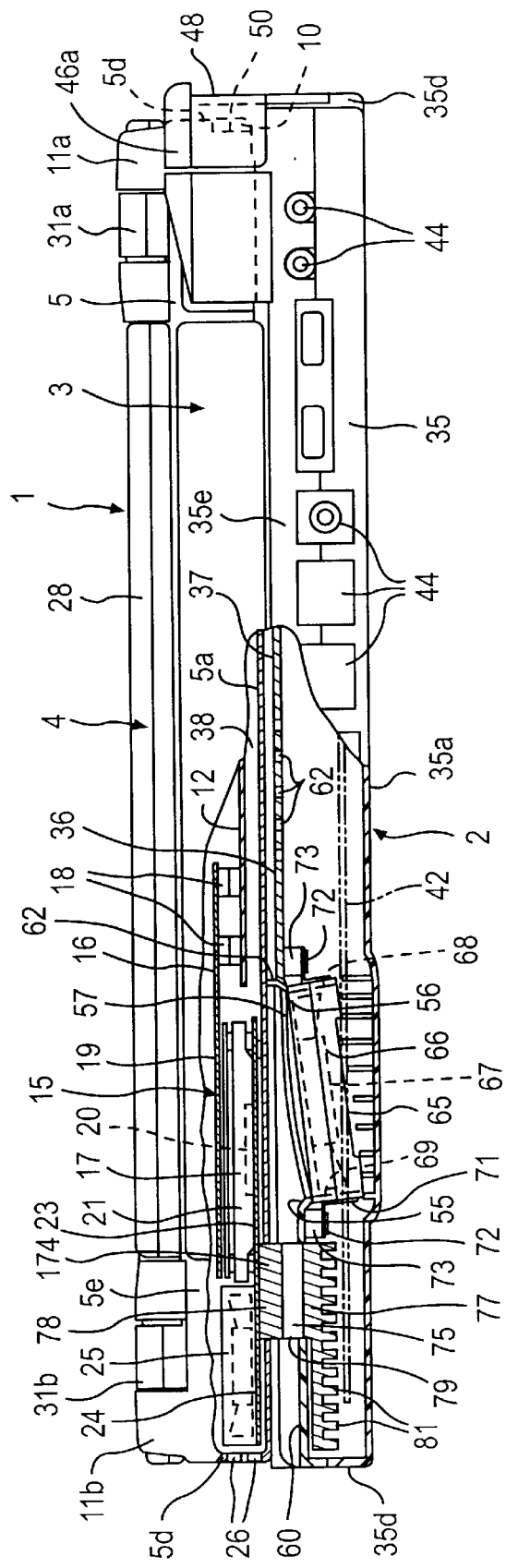
FIG. 15 is a rear view including a partial cross sectional view showing a state in which the portable computer is mounted on the mounting face of the extension device of FIG. 14.
Figure 16:
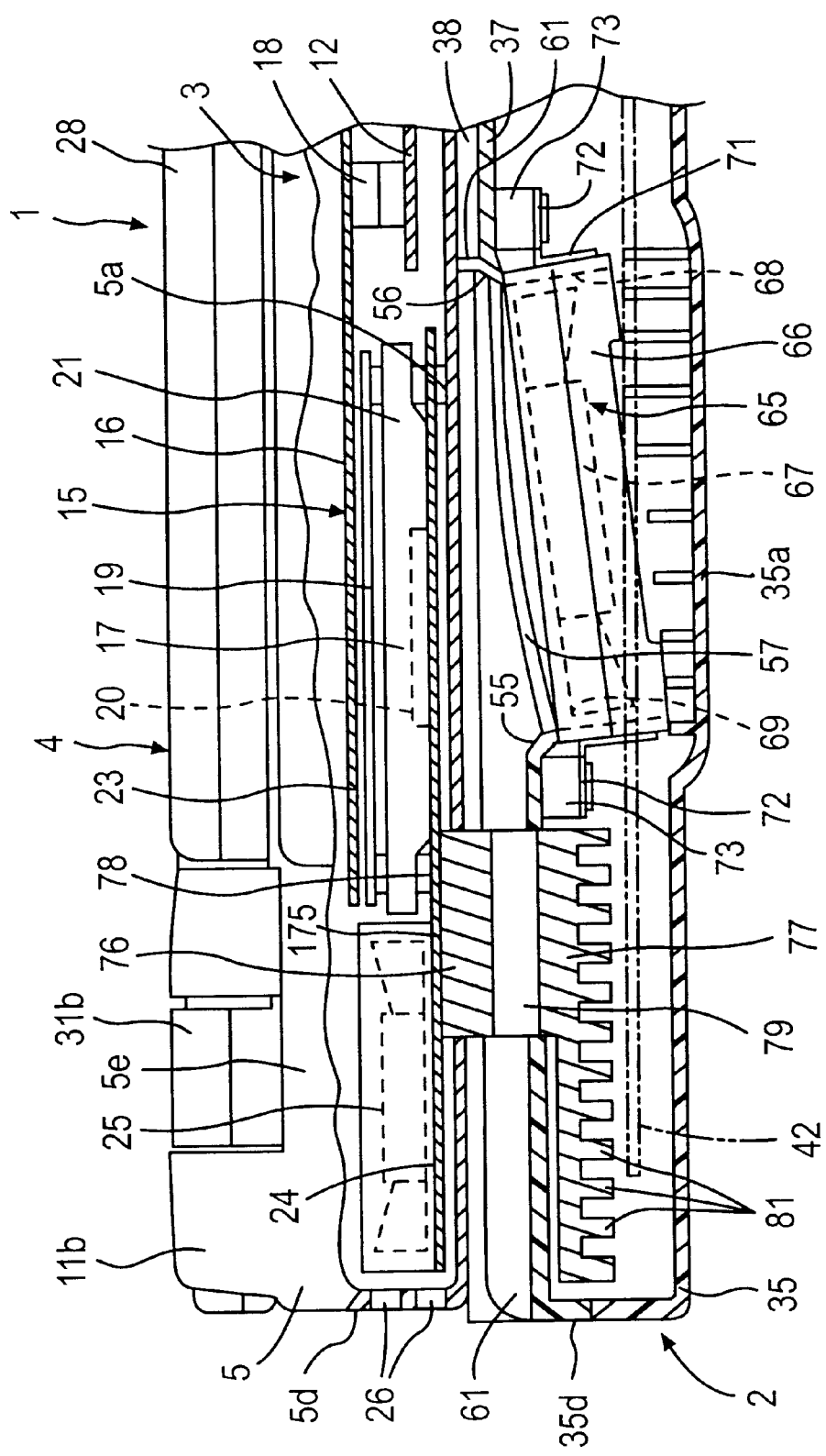
FIG. 16 is a cross sectional view showing the positional relationship between a fan unit of the extension device and an MPU in the state in which the portable computer is mounted on the mounting face of the extension device of FIG. 14.
Figure 17:
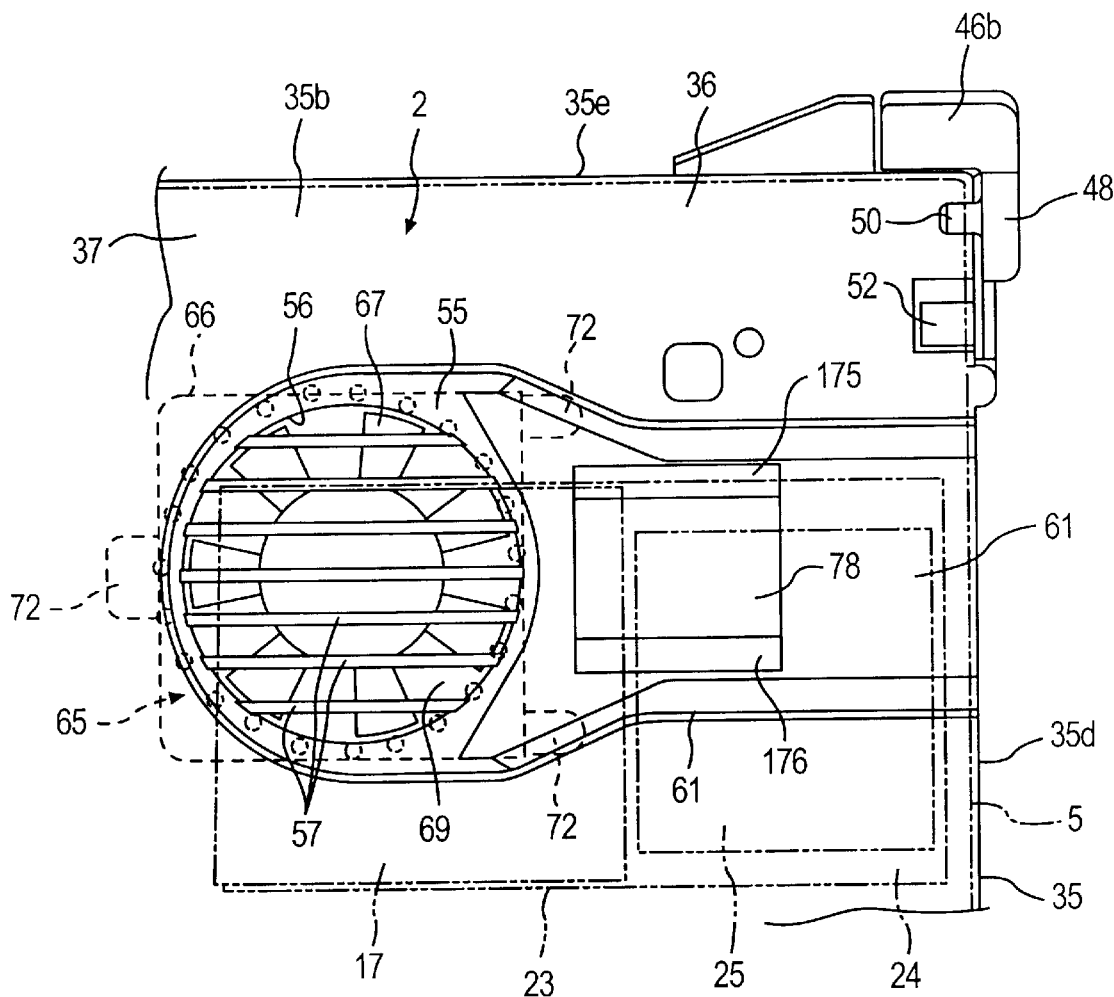
FIG. 17 is a plan view showing a cooling air passage of the extension device of FIG. 14.
Figure 18:
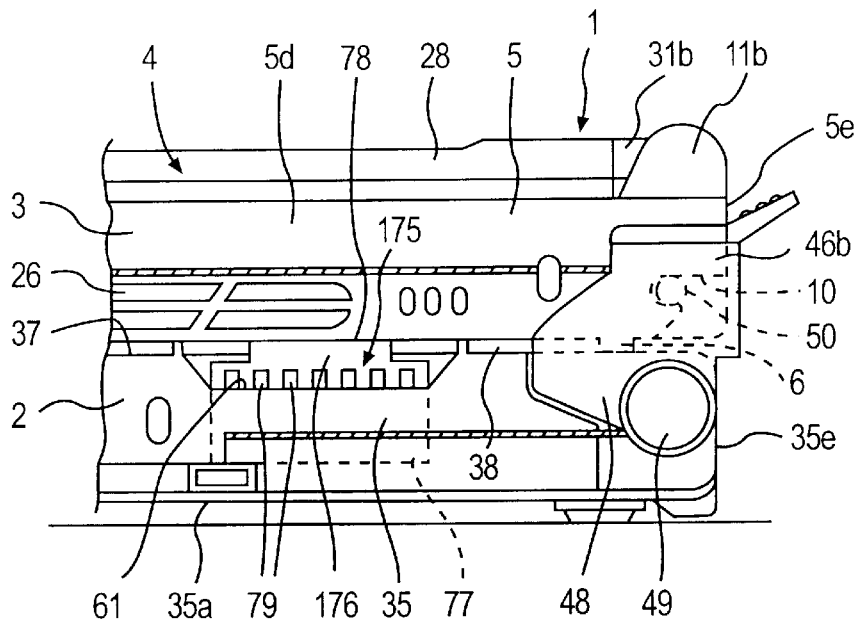
FIG. 18 is a side view showing the positional relationship between the cooling air passage of the extension device of FIG. 14 and the housing.

Furthermore, FIG. 13 discloses a fifth embodiment of the present invention.

The fifth embodiment is a modification of the third embodiment. The basic structures of a portable computer 1 and an extension device 2 are the same as those in the third embodiment.

More specifically, a plurality of leading ports 120 is formed on a bottom wall 5a of a housing 5 in the fifth embodiment. The leading port 120 is formed in a position corresponding to an MPU 17 which generates heat, and is opposed to an exhaust port 56 on a mounting face 37 when the housing 5 is mounted on the mounting face 37 of the base 35.

With such a structure, when the air in the base 35 is sucked with the driving of the fan unit 65, the air in the housing 5 is sucked into the base 35 through a suction passage 95. Therefore, a cooling air flow turned to an air suction passage 109 is formed in the housing 5 as shown by an arrow in FIG. 13.

A part of the cooling air sprayed onto the bottom wall 5a of the housing 5 through an exhaust port 56 of the base 35 is blown off into the housing 5 through the leading port 120 and is led to the periphery of the MPU 17 which generates heat.

In this case, the air in the housing 5 is sucked from a first connector hole 100 toward the base 35. Therefore, a negative pressure is also applied to the leading port 120 so that the cooling air blown off into the leading port 120 easily flows into the housing 5. Consequently, the air permeability can be enhanced in the housing 5 and the cooling air can be more efficiently led from the periphery of the MPU 17 which generates heat.

Accordingly, the cooling air is sprayed onto the bottom wall 5a of the housing 5 and all the corners in the housing 5 can be cooled. In addition, the MPU 17 which acts as a heat source can be cooled, and the cooling effects of the MPU 17 and furthermore the housing 5 can be enhanced still more.

While the fan unit has been provided on the exhaust port of the base in each of the above-mentioned embodiments, the present invention is not restricted thereto but it may be provided in the base apart from the exhaust port or in the vicinity of a suction port depending on circumstances.

A sixth embodiment of the present invention is described below with reference to FIGS. 14 to 18.

The first heat sink 23 is disposed along the internal face of the bottom wall 5a of the housing 5 and is screwed to the bottom wall 5a. A fan unit 25 is fixed to the upper face of the fan fixing portion 24. The exhaust passage 61 is positioned below the first heat sink 23 in the housing 5 when the housing 5 is mounted on the mounting face 37.

As shown in FIGS. 6 and 8, a rib-shaped convex portion 62 is integrally formed in the edge portion of the exhaust passage 61 connected with the mounting face 37 and the opening edge portion of the recessed portion 55. The convex portion 62 is protruded upward from the mounting face 37. The convex portion 62 is provided to continuously surround the recessed portion 55 and the exhaust passage 61 over the mounting face 37, and has an end portion reaching the right side wall 5d of the housing 5. The tip of the convex portion 62 contacts the bottom wall 5a of the housing 5 when the housing 5 is mounted on the mounting face 37. By this contact, the gap 38 formed on the mounting face 32 and the exhaust passage 61 and exhaust port 56 are kept apart from one another without communication.

As shown in FIGS. 14 to 17, a second heat sink 175 acting as heat transferor is provided in the mounting portion 36 of the body 35. The second heat sink 175 is formed of a metal material having high heat conduction, such as an aluminum alloy or a copper-based alloy.

The second heat sink 175 comprises a heat receiving portion 176 mounted in a exhaust passage 61 and a heat radiating portion 77 connected with the heat receiving portion 176. The heat receiving portion 176 has a block shape with almost the same width as the width of the exhaust passage 61, and protrudes upward from the bottom of the exhaust passage 61. The upper end of the heat receiving portion 176 acts as a rectangular and flat heat receiving face 78. The heat receiving face 78 is positioned on the same level as the upper end of the convex portion 62. The heat receiving face 78 contacts the bottom wall 5a of the housing 5 when the housing 5 is mounted on the mounting face 37. The contact portion of the heat receiving face 78 with the bottom wall 5a is positioned below the first heat sink 23 near the IC chip 20 generating heat. Accordingly, the heat receiving portion 176 of the second heat sink 175 is thermally connected to the bottom wall 5a of the housing 5.

The heat receiving portion 176 has a plurality of through holes 79. The through holes 79 extend in the direction of the exhaust passage 61 in the passage 60, and are spaced at intervals in the direction of the width. The cooling air flows in the through holes 79. Therefore, the cooling air can flow smoothly in the exhaust passage 61 irrespective of the arrangement of the heat receiving portion 176 in the exhaust passage 61.

The heat radiating portion 77 of the second heat sink 175 extends through the bottom of the exhaust passage 61 and protrudes into the inside of the body 35. The heat radiating portion 77 is adjacent to the fan unit 65. A plurality of heat radiating fins 81 is formed on the lower face of the heat radiating portion 77.

With such a structure, when the desired extension function is to be added to the portable computer 1, the housing 5 of the portable computer 1 is first mounted on the mounting face 37 of the extension device 2 and is locked onto the mounting face 37 through the rear hook levers 46a and 46b and the front hook 47. Consequently, the first extension connector 14 of the housing 5 is fitted in the second extension connector 45 of the extension device 2, and the portable computer 1 is electrically connected to the extension device 2 through the first and second extension connectors 14 and 45.

In the process in which the portable computer 1 is connected to the extension device 2 during use, when the temperature of the IC chip 20 of the MPU 17 increases, the heat of the IC chip 20 is transferred to the first heat sink 23. The first heat sink 23 is screwed to the bottom wall 5a along the internal face of the bottom wall 5a of the housing 5. Therefore, the heat of the IC chip 20 that is transferred to the first heat sink 23 is diffused by heat conduction toward the bottom wall 5a of the housing 5.

When the fan unit 65 of the extension device 2 is driven with an increase in the temperature of the IC chip 20, the air in the body 35 is sucked through the suction port 68 of the fan casing 66. The air is blown off from the exhaust port 69 to the exhaust passage 61 through the exhaust port 56 and becomes cooling air to be directly sprayed onto the bottom wall 5a of the housing 5. The cooling air flows along the exhaust passage 61, and is then discharged from the downstream end of the exhaust passage 61 toward the right side of the body 35.

In this case, the exhaust port 56 provided on the mounting face 37 and the exhaust passage 61 are opposed to the bottom wall 5a which receives the thermal effects of the MPU 37 and the first heat sink 23. Therefore, the bottom wall 5a is intensively cooled by a forced convection using the air as a medium. For this reason, the heat of the IC chip 20 which is transferred to the bottom wall 5a can be efficiently discharged to the outside of the housing 5.

On the other hand, in the state in which the housing 5 of the portable computer 1 is mounted on the mounting face 37 of the extension device 2, the heat receiving face 78 of the second heat sink 175 comes in contact with the bottom wall 5a of the housing 5 which receives the heat of the IC chip 20 and the second heat sink 175 is thermally connected to the bottom wall 5a.

For this reason, the heat of the IC chip 20 which is transferred to the bottom wall 5a is transferred from the heat receiving face 37 to the heat receiving portion 176 of the second heat sink 175, and is diffused from the heat receiving portion 176 toward the heat radiating portion 76. Apparently, the heat capacity of the bottom wall 5a is increased. The heat radiating portion 76 fully keeps a contact area with the air by the existence of the heat radiating fins 81. Therefore, the heat transferred to the heat radiating portion 76 is discharged to the inside of the body 35.

Moreover, since the heat receiving portion 176 of the second heat sink 175 is provided in the exhaust passage 61, it is forcibly cooled by the cooling air flowing in the exhaust passage 61. Consequently, the heat of the IC chip 20 which is transferred to the heat receiving portion 60 can be radiated toward the outside together with the flow of the cooling air.

According to such a structure, therefore, the heat of the IC chip 20 of the portable computer 1 can be efficiently radiated toward the outside of the housing 5 by utilizing both the forced air cooling of the housing 5 using the air as a medium and heat conduction to the second heat sink 175 as long as the portable computer 1 is connected to the extension device 2. Correspondingly, the heat radiation of the IC chip 20 can be enhanced. Accordingly, even if the size of each of the first heat sink 23 and the fan unit 25 is reduced, the temperature of the MPU 17 can be kept within the range of an operation guarantee temperature. The original performance of the MPU 17 can be exhibited to the maximum and high-speed arithmetic processing and the like can be executed.

Figure 19:
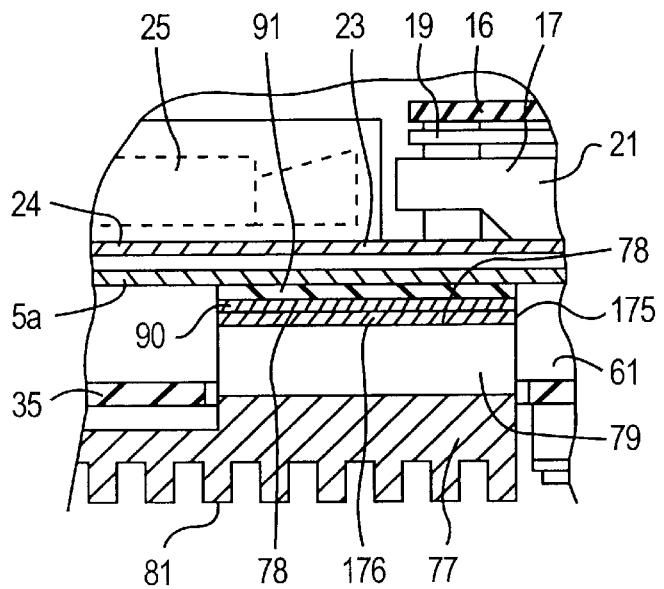
FIG. 19 is a cross sectional view showing a portion in which a bottom wall of the housing and a second heat sink are contact with each other according to a seventh embodiment of the present invention.

The present invention is not restricted to the first embodiment described above and FIG. 19 shows a seventh embodiment of the present invention.

In the seventh embodiment, a heat conducting member 191 is mounted to the heat receiving face 78 of a second heat sink 175 with an adhesive 190. The heat conducting member 191 is formed of a rubber-like elastic body (produced by adding alumina to a silicone resin, for example) and has a sheet shape, which provides high heat conduction. When a housing 5 of the portable computer 1 is mounted on a mounting face 37, the heat conducting member 191 contacts a bottom wall 5a of the housing 5 which receives the thermal effects of the IC chip 20 and is interposed between the bottom wall 5a and the heat receiving face 78. Accordingly, the bottom wall 5a of the housing 5 is thermally connected to the second heat sink 175 through the heat conducting member 191.

With such a structure, the heat conducting member 191 can be elastically deformed. Therefore, when the housing 5 is mounted on the mounting face 37, the heat conducting member 191 absorbs the dimensional tolerance of each of the housing 5 and the body 35 and contacts the bottom wall 5a of the housing 5 without clearance. Therefore, this prevents a space to obstruct heat conduction from being generated between the bottom wall 5a and the heat receiving face 78 of the second heat sink 175. The heat resistance can be reduced from the bottom wall 5a to the second heat sink 175 so that the heat radiation of the bottom wall 5a can be enhanced.

The heat conducting member 191 is not limited to the above-mentioned rubber-like elastic body. A bag formed of a flexible film enclosing an actuating medium made of a heat conductive liquid or a gel substance, for example, a so-called pack containing a liquid may be used.

Figure 20:
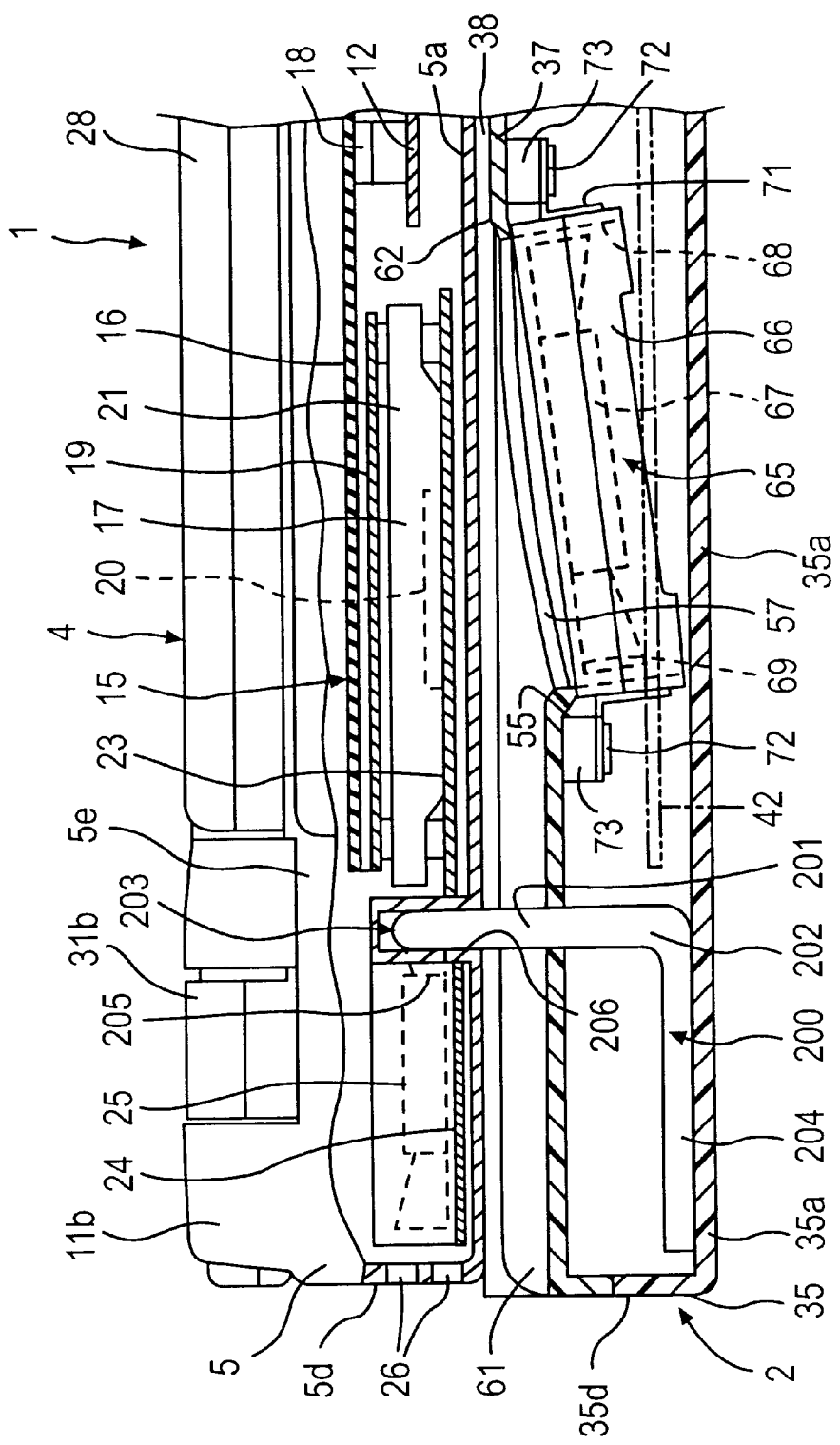
FIG. 20 is a cross sectional view showing a state in which the portable computer is mounted on the mounting face of the extension device according to an eighth embodiment of the present invention.

FIG. 20 shows an eighth embodiment of the present invention.

In the eighth embodiment, the specific structure of a second heat sink 200 is different from that in the sixth embodiment and the basic structures of a portable computer 1 and an extension device 2 are the same as those in the sixth embodiment.

As shown in FIG. 20, a second heat sink 200 of the extension device 2 has a circular or square bar-like shape in cross section. The second heat sink 200 is formed of a metal material with high heat conduction such as aluminium or a copper-based alloy, and is supported on the body 35.

The second heat sink 200 has a first portion 201 disposed in an exhaust passage 61 and a second portion 202 extending through the bottom of the exhaust passage 61 and introduced into the body 35. The first portion 201 extends upward from the bottom of the exhaust passage 61, and the upper part of the first portion 201 constitutes a fitting projection 203 protruding upward from a mounting face 37. The second portion 202 has a heat radiating portion 204 extending along a bottom wall 35a of the body 35. The heat radiating portion 204 contacts the upper face of the bottom wall 35a.

The bottom wall 5a of the housing 5 has a fitting concave portion 205 in a portion opposed to the exhaust passage 61. When the housing 5 is mounted on the mounting face 37, the fitting projection 203 of the second heat sink 200 is removably fitted in the fitting concave portion 205. The fitting concave portion 205 has an inserting hole 206 opened on the bottom wall 5a of the housing 5. The fitting concave portion 205 projects into the housing 5, and is positioned between the MPU 17 and a fan unit 25 in the housing 5 and extends through the first heat sink 23.

In the state in which the fitting projection 203 is fitted in the fitting concave portion 205, the outer peripheral face of the fitting projection 203 contacts the inner peripheral face of the fitting concave portion 205. By the contact, the housing 5 and the second heat sink 200 are thermally connected to each other. In this case, the fitting concave portion 205 and the fitting projection 203 extend in the direction of the thickness of the housing 5, respectively. Therefore, the fitting length of the fitting concave portion 205 and the fitting projection 203 and furthermore their contact area can be maintained.

According to such a structure, in the state in which the housing 5 of the portable computer 1 is mounted on the mounting face 37 of the extension device 2, the fitting projection 203 of the second heat sink 200 is fitted in the fitting concave portion 205 of the bottom wall 5a of the housing 5. Consequently, the second heat sink 200 and the housing 5 are thermally connected to each other. For this reason, the heat of the IC chip 20 which is transferred to the bottom wall 5a is discharged from the fitting concave portion 205 to the second heat sink 200. Accordingly, the heat capacity of the bottom wall 5a is increased. The heat radiating portion 204 of the second heat sink 200 contacts the bottom wall 35a of the body 35. Therefore, the heat transferred to the heat radiating portion 204 is discharged toward the outside of the extension device 2 by natural air cooling through the diffusion to the body 35.

Accordingly, the heat of the IC chip 20 that is transferred to the housing 5 can be efficiently discharged to the outside of the housing 5 by the transfer to the second heat sink 200. Even if the size of each of the first heat sink 23 and the fan unit 25 which promotes the heat radiation of the IC chip 20 is reduced, the temperature of the MPU 17 can be kept within the range of an operation guarantee temperature.

Figure 21A:
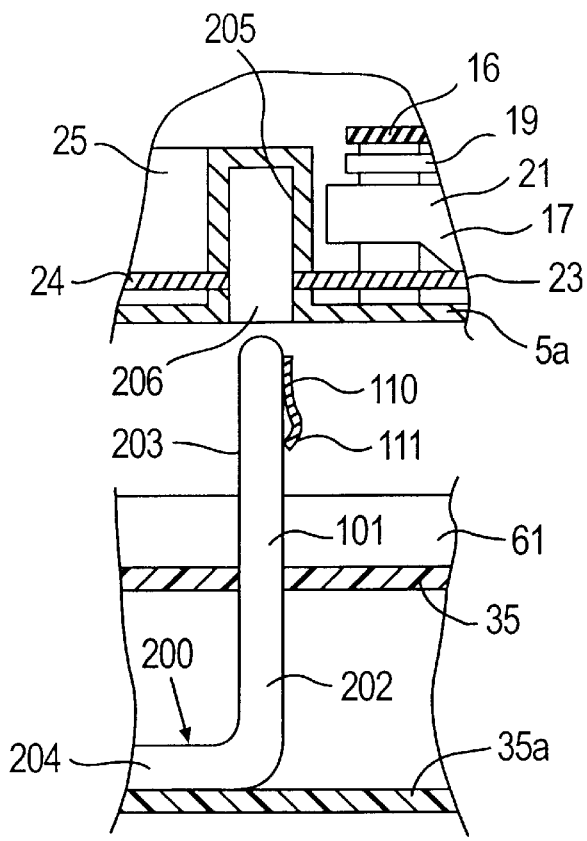
FIG. 21(A) is a cross sectional view showing the positional relationship between a fitting projection of the second heat sink and a fitting concave portion of the housing according to the ninth embodiment of the present invention.

FIG. 21 discloses a ninth embodiment of the present invention. The ninth embodiment is a modification of the eighth embodiment, and the basic structure of the second heat sink 200 is the same as in the eighth embodiment.

A leaf spring 110 is attached to the outer peripheral face of a fitting projection 203 of a second heat sink 200 by welding or the like. The leaf spring 110 is band-shaped to extend in the axial direction of the fitting projection 203. The leaf spring 110 has a pressing portion 111. The pressing portion 111 can be elastically deformed over a first position (shown in FIG. 21A) where it protrudes to the outside in the radial direction of the fitting projection 203 and a second position (shown in FIG. 21B) where it overlaps with the outer peripheral face of the fitting projection 203. The pressing portion 111 maintains such elastic force as to return to the first position.

Figure 21B:
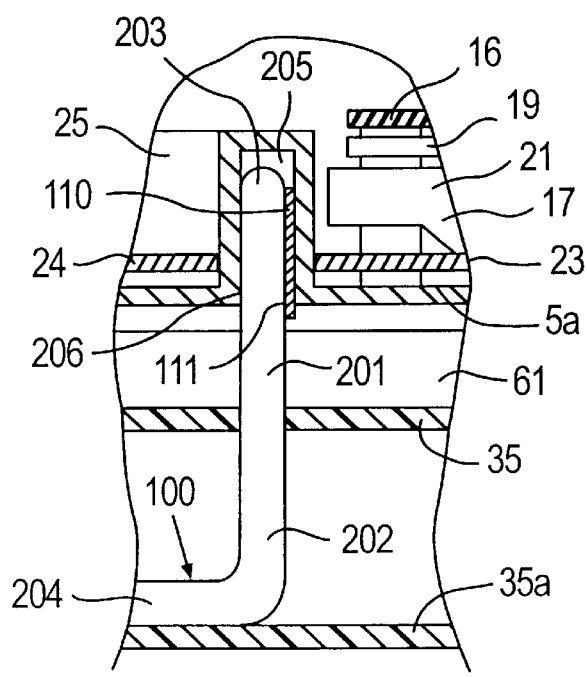
FIG. 21(B) is a cross sectional view showing a state in which the fitting projection of the second heat sink is fitted in the fitting concave portion of the housing.

The fitting concave portion 205 of the housing 5 has a hole diameter in which the fitting projection 203 can be inserted with play. For this reason, when the fitting projection 203 of the second heat sink 200 is inserted in the fitting concave portion 205 through an inserting hole 206, the pressing portion 111 of the leaf spring 110 slidably comes in contact with the inner peripheral face of the fitting concave portion 205 and is deformed from the first position to the second position as shown in FIG. 21B. By the deformation, an outer peripheral face opposed to the leaf spring 110 of the fitting projection 203 is pushed against the inner peripheral face of the fitting concave portion 205 so that the fitting projection 203 and the fitting concave portion 205 are thermally connected to each other.

By such a structure, the fitting projection 203 is pushed against the inner peripheral face of the fitting concave portion 205 by the pressing portion 111 of the leaf spring 110. Therefore, the contact state of the fitting projection 203 with the fitting concave portion 205 can be enhanced. Consequently, the heat resistance of the contact portion of the fitting projection 203 with the fitting concave portion 205 can be reduced so that the heat of the bottom wall 5a can be efficiently discharged to the second heat sink 200.

Figure 22:
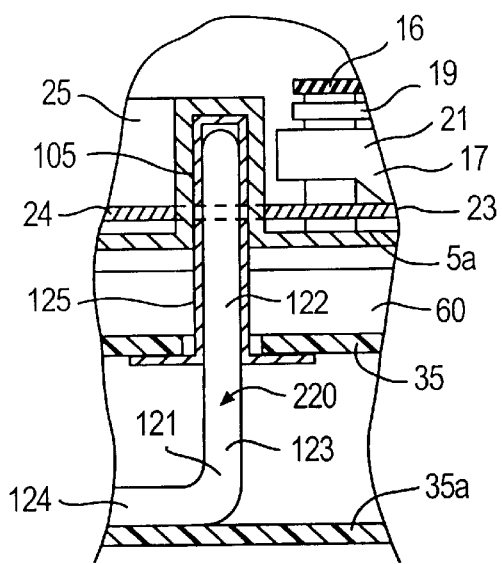
FIG. 22 is a cross sectional view showing a state in which the heat pipe is fitted in the fitting concave portion of the housing according to a tenth embodiment of the present invention.

FIG. 22 discloses a twelfth embodiment of the present invention.

In the twelfth embodiment, a heat conductor of the extension device 2 is formed of a heat pipe 220. The heat pipe 220 has a pipe body 121 filled with an actuating medium, such as water or alcohol. The pipe body 121 has a first portion 122 provided in the exhaust passage 61 and a second portion 123 extending through the bottom of the exhaust passage 61 and introduced into the body 35.

The first portion 122 extends upward from the bottom of the exhaust passage 61, an upper portion of the first portion 122 is projected over the mounting face 37. The second portion 123 has a heat radiating portion 124 extending along the bottom wall 35a of the body 35. The heat radiating portion 124 is in contact with the upper face of the bottom wall 35a.

A pipe cover 125 is attached to the first portion 122 of the heat pipe 220. The pipe cover 125 is made of a metal material with high heat conduction such as aluminum or copper-based alloy. The pipe cover 125 covers the first portion 122 of the heat pipe 220 without clearance. The pipe cover 125 can removably be fitted to the fitting concave portion 205 of the housing 5.

With such a structure, in the state in which the housing 5 of the portable computer 1 is mounted on the mounting face 37 of the extension device 2, the first portion 122 of the heat pipe 220 is fitted in the fitting concave portion 205 of the bottom wall 5a of the housing 5 through the pipe cover 125. Thus the heat pipe 220 and the housing 5 are thermally connected to each other.

Therefore, the heat of the IC chip 20 is transferred to the bottom wall 5a of the housing 5 through the first heat sink 23, and then the heat is transferred to the first portion 122 of the heat pipe 220 through the fitting concave portion 205 of the bottom wall 5a. By the heat conduction, the actuating medium in the pipe body 121 is heated so that the actuating medium is vaporized. The vapor flows from the first portion 122 of the heat pipe 220 to the heat radiating portion 124 through the second portion 123. Since the heat radiating portion 124 of the heat pipe 220 is introduced into the extension device 2, the temperature of the heat radiating portion 124 is lower than that of the first portion 122 and a low internal pressure is maintained.

Therefore, the vapor introduced into the heat radiating portion 124 is radiated and condensed. The actuating medium liquefied by condensation is refluxed from the heat radiating portion 124 to the first portion 122 so as to be heated again with the heat of the bottom wall 5a. The evaporation and condensation of the actuating medium are repeated so that heat of the bottom wall 5a is positively transferred to the body 35 of the extension device 2.

Therefore, the heat of the IC chip 20 transferred to the housing 5 can efficiently be discharged to the outside of the housing 5 through the heat pipe 220. Even if the size of each of the first heat sink 23 and the fan unit 25 for enhancing the radiation of the IC chip 20 is reduced, the temperature of the MPU 17 can be kept within the range of an operation guarantee temperature.

Figure 23:
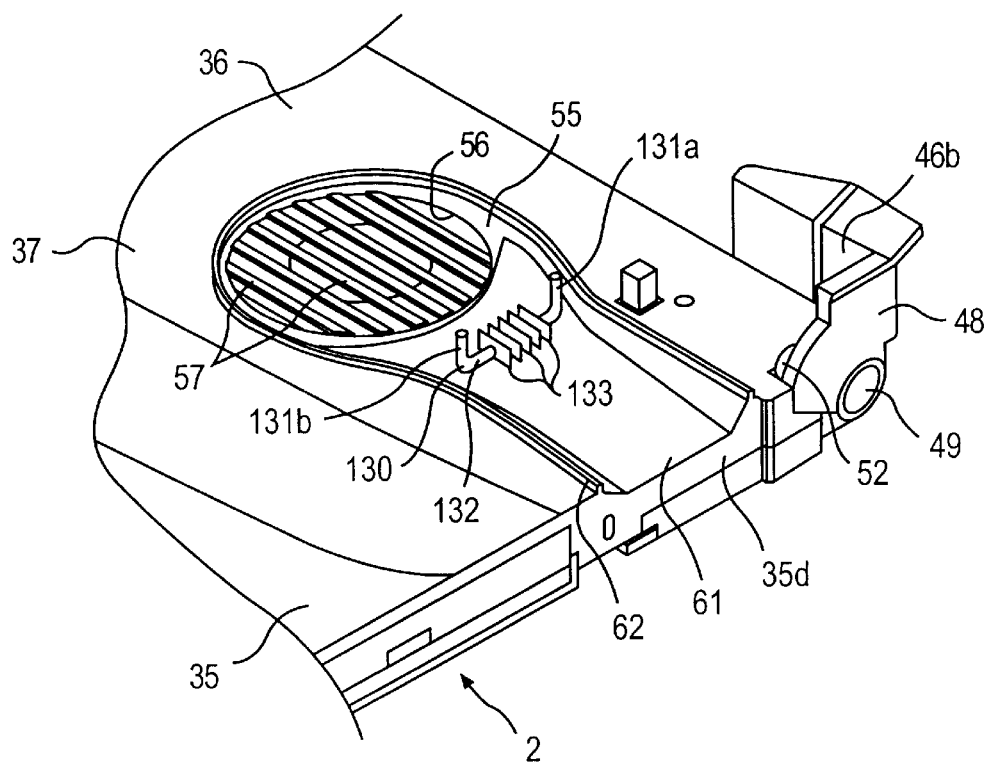
FIG. 23 is a perspective view showing the extension device to illustrate the shapes of the cooling air passage and the second heat sink disposed in the cooling air passage according to an eleventh embodiment of the present invention.
Figure 24:
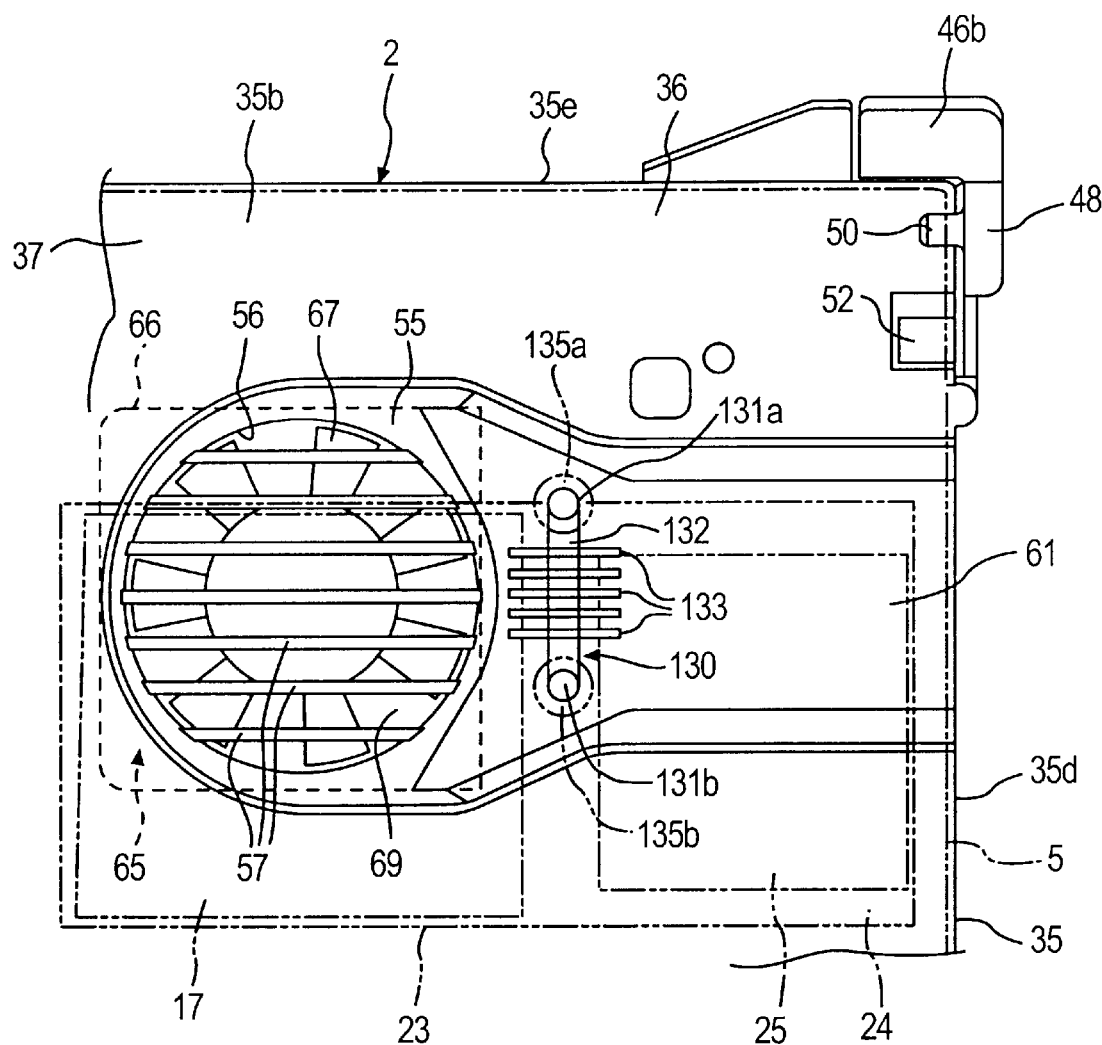
FIG. 24 is a plan view showing the extension device to illustrate the shapes of the cooling air passage and the second heat sink disposed in the cooling air passage.
Figure 25:
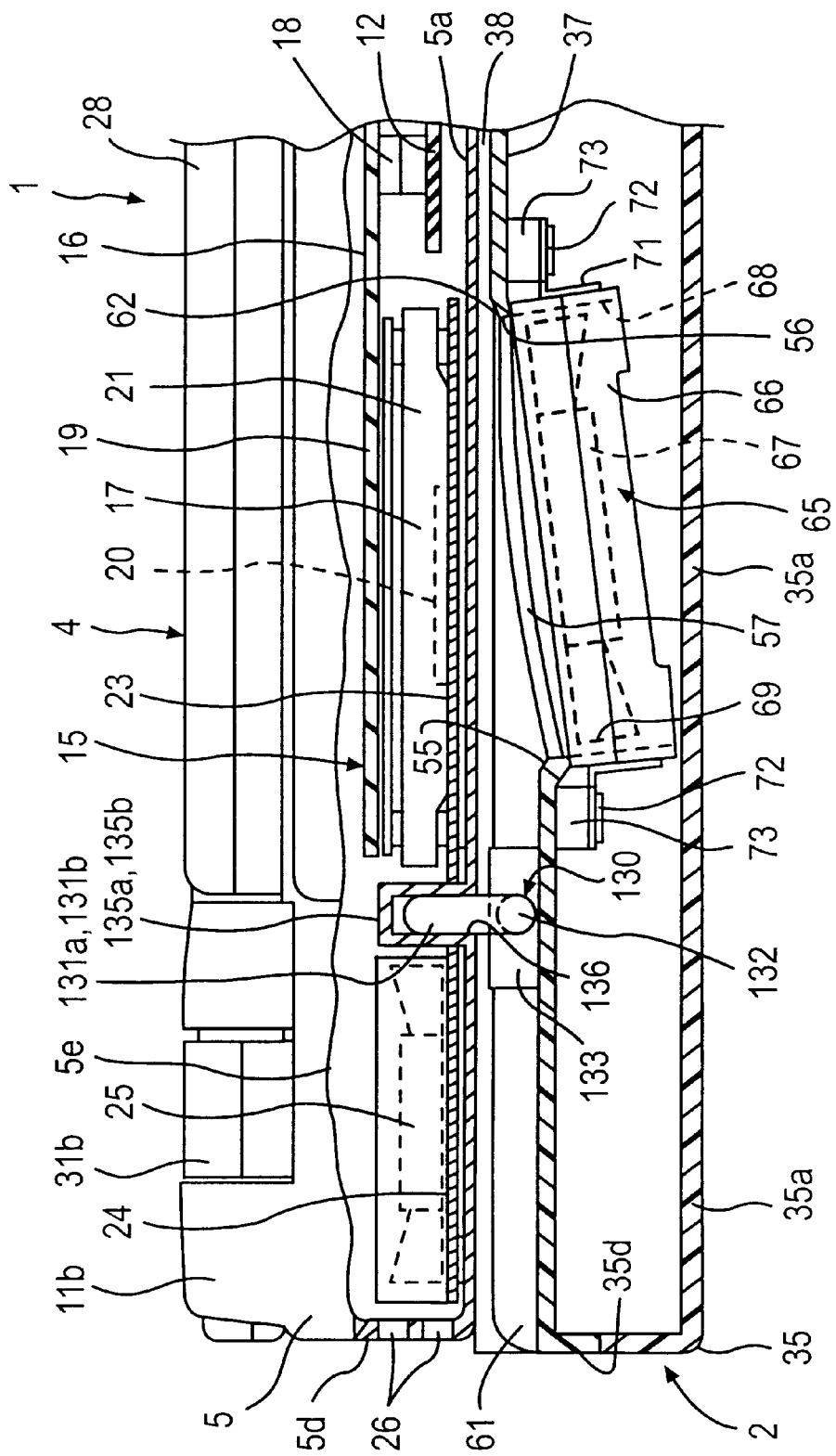
FIG. 25 is a cross sectional view showing a state in which the portable computer is mounted on the mounting face of the extension device.

FIGS. 23 to 25 disclose an eleventh embodiment of the present invention.

The eleventh embodiment is different from the sixth to tenth embodiments in the specific structure of a second heat sink 130. The other basic structures of the portable computer 1 and the extension device 2 are the same as those of each of the foregoing embodiments.

As shown in FIG. 23, the second heat sink 130 disposed in the exhaust passage 61 is formed of a metal column with high heat conduction such as aluminum alloy or copper-based alloy. The second heat sink 130 is disposed just behind the exhaust port 56. The second heat sink 130 has a pair of fitting projections 131a and 131b and a connecting portion 132 for connecting the fitting projections 131a and 131b to each other.

The fitting projections 131a and 131b are disposed apart from each other in a direction of the length of the mounting face 37. Moreover, the fitting projections 131a and 131b extend upward from the bottom of the exhaust passage 61. The upper portions of the fitting projections 131a and 131b project upward from the exhaust passage 61 to the upper portion of the mounting face 37. The connecting portion 132 is supported on the bottom of the exhaust passage 61 and linearly extends to traverse the exhaust passage 61.

A plurality of radiating fins 133 is attached to the outer peripheral face of the connecting portion 132. The radiating fins 133 are disposed apart from each other in the axial direction of the connecting portion 132. Moreover, each of the radiating fins 133 extends in the direction of the flow of the cooling air in the exhaust passage 61.

As shown in FIGS. 24 and 25, the bottom wall 5a of the housing 5 has a pair of fitting concave portions 135a and 135b in a portion facing the exhaust passage 61. When the housing 5 is mounted on the mounting face 37, the fitting projections 131a and 131b of the second heat sink 130 are removably fitted to the fitting concave portions 135a and 135b. Each of the fitting concave portions 135a and 135b has an insertion port 136 opened in the bottom wall 5a of the housing 5. The fitting concave portions 135a and 135b project to the internal portion of the housing 5 so as to be, in the housing 5, disposed between the MPU 17 and the fan unit 25. Moreover, the fitting concave portions 135a and 135b extend into the first heat sink 23.

In a state in which the housing 5 of the portable computer 1 is mounted on the mounting face 37 of the extension device 2, the outer peripheral faces of the fitting projections 131a and 131b the internal faces of the fitting concave portions 135a and 135b. Thus the second heat sink 130 and the housing 5 are thermally connected to each other.

With such a structure, the heat of the IC chip 20 transferred to the bottom wall 5a is transferred from the fitting concave portions 135a and 135b to the fitting projections 131a and 131b of the second heat sink 130. Moreover, the heat is diffused because of the heat conduction from the fitting projections 131a and 131b to the connecting portion 132. Therefore, the heat capacity of the bottom wall 5a is increased.

The fan unit 65 of the extension device 2 is driven with an increase in the temperature of the IC chip 20, the air in the body 35 is discharged from the exhaust port 56 to the exhaust passage 61. Discharged air serving as cooling air is supplied to the bottom wall 5a of the housing 5 and the second heat sink 130. Since the connecting portion 132 of the second heat sink 130 extends in the direction traversing the flow of the cooling air and has the plurality of radiating fins 133, a sufficiently large area of contact with cooling air can be maintained. Moreover, the connecting portion 132, together with the bottom wall 5a, is intensively cooled by a forced convection using the air as a medium.

Therefore, the heat transferred to the housing 5 can efficiently be discharged to the outside of the housing 5 by using both the heat conduction to the second heat sink 130 and forced cooling using cooling air. Therefore, even if the size of each of the first heat sink 23 and the fan unit 25 for enhancing the radiation of the IC chip 20 is reduced, the temperature of the MPU 17 can be kept within the range of an operation guarantee temperature.

Figure 26:
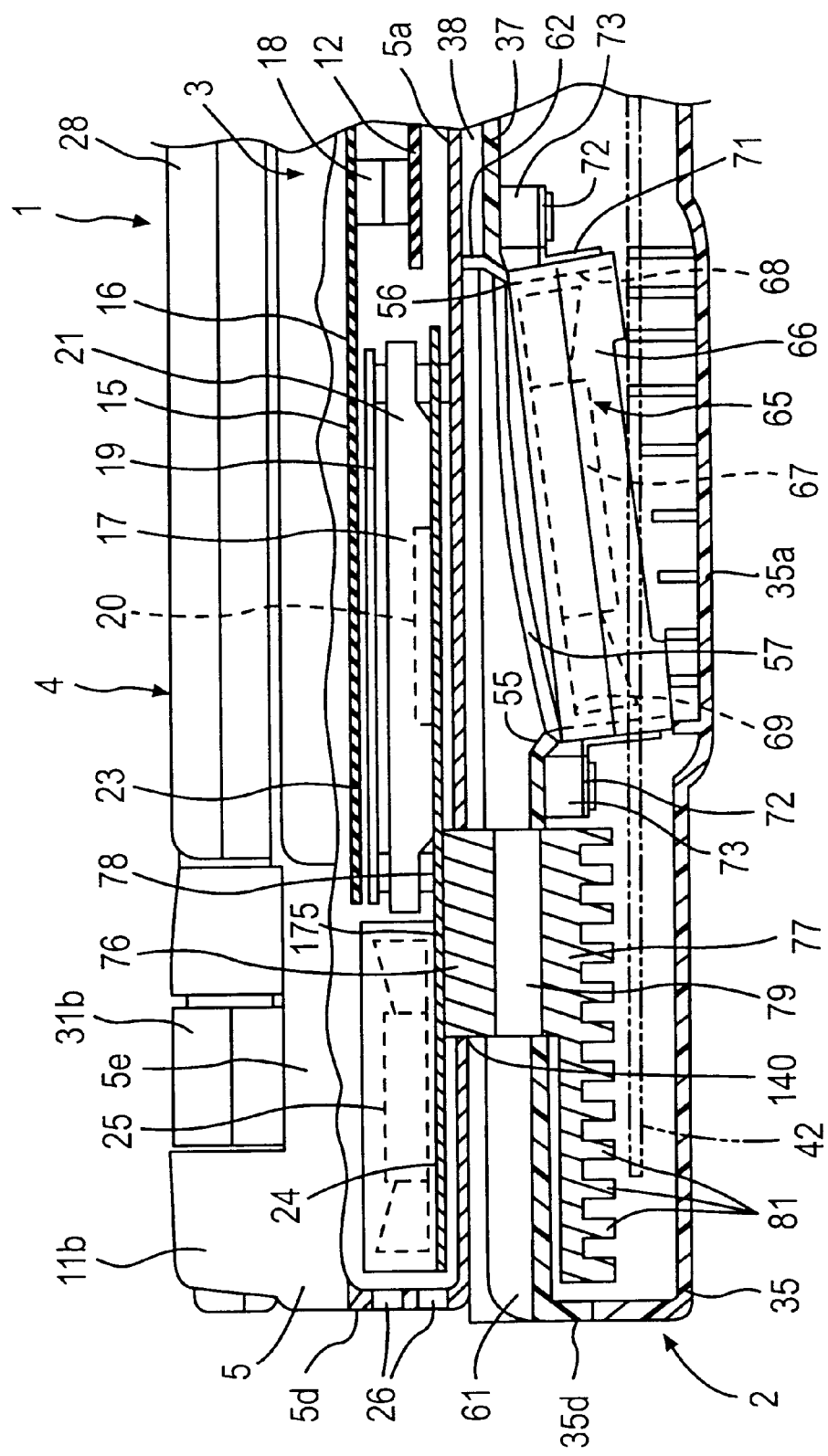
FIG. 26 is a cross sectional view showing a state in which the portable computer is mounted on the mounting face of the extension device according to a twelfth embodiment of the present invention.
Figure 27:
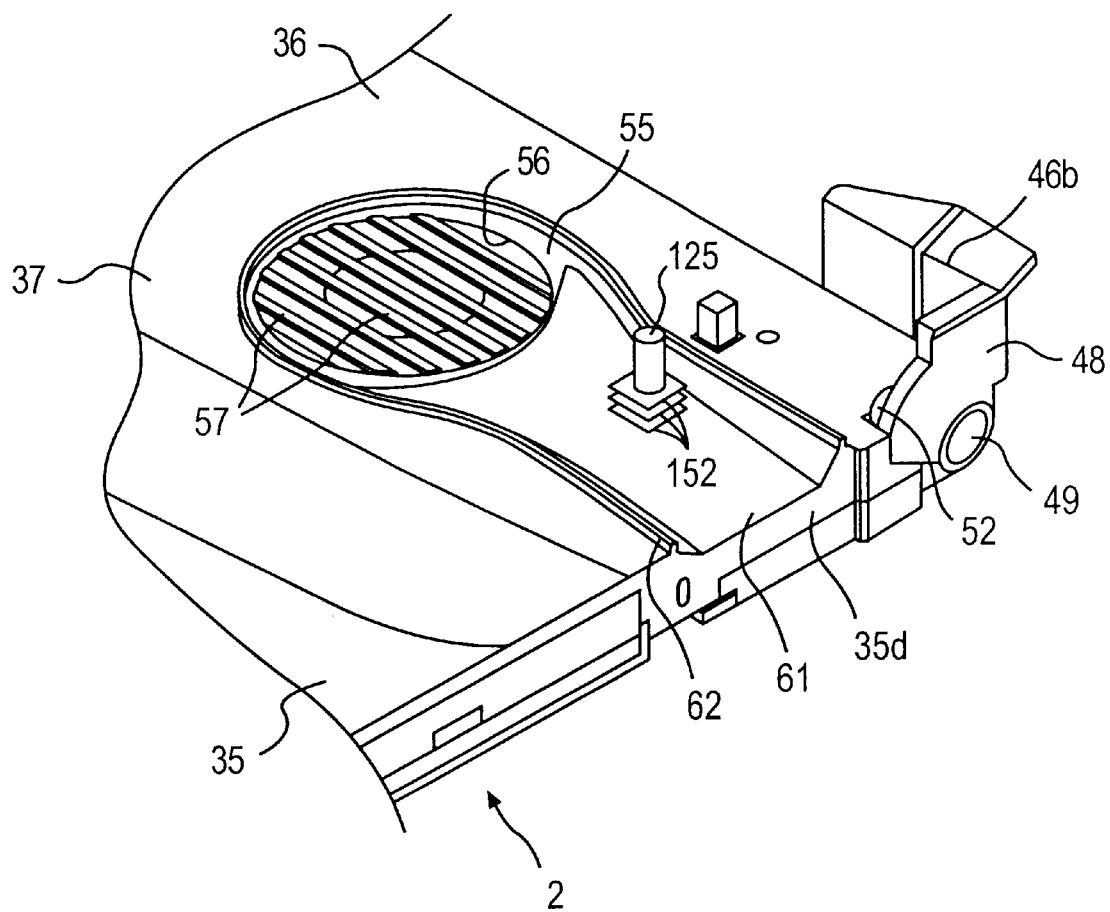
FIG. 27 is a perspective view showing the extension device to illustrate the cooling air passage and the heat pipe projecting into the cooling air passage according to a thirteenth embodiment of the present invention.

FIG. 26 discloses a twelfth embodiment of the present invention.

The twelfth embodiment is different from the sixth embodiment in that the heat receiving face 78 of the second heat sink 175 directly contacts the first heat sink 23 of the housing 5. The other basic structures of the portable computer 1 and the extension device 2 are the same as those of the sixth embodiment.

As shown in FIG. 26, the heat receiving face 78 of the second heat sink 175 projects upward over the convex portion 62 on the mounting face 37. Moreover, the bottom wall 5a of the housing 5 has an opening 140 formed at a position corresponding to the heat receiving portion 176 of the second heat sink 175. The opening 140 is formed to permit insertion of the heat receiving portion 176. Thus, the first heat sink 23 is exposed to the outside of the housing 5 through the opening 140.

Therefore, when the housing 5 of the portable computer 1 is mounted on the mounting face 37 of the extension device 2, the heat receiving portion 176 of the second heat sink 175 is introduced into the housing 5 through the opening 140. Thus, the heat receiving face 78 of the heat receiving portion 176 is brought into contact with the lower face of the first heat sink 23.

With such a structure, when the housing 5 of the portable computer 1 is mounted on the mounting face 37 of the extension device 2, the heat receiving face 78 of the second heat sink 175 is in contact with the first heat sink 23. Thus, the second heat sink 175 and the first heat sink 23 are thermally connected to each other. Therefore, the heat of the IC chip 20 transferred to the first heat sink 23 is directly transferred to the second heat sink 175 bypassing the housing 5. Therefore, apparently, the heat capacity of the first heat sink 23 can be increased.

The fan unit 65 of the extension device 2 is driven with an increase in the temperature of the IC chip 20, the air in the body 35 is blown off from the exhaust port 56 to the exhaust passage 61. The air serving as cooling air is applied to the bottom wall 5a of the housing 5 and the heat receiving portion 176 of the second heat sink 175. Therefore, the second heat sink 175, together with the bottom wall 5a, is cooled by the forced convection using the air as a medium. Therefore, the heat of the IC chip 20 transferred to the first heat sink 23 can efficiently be discharged to the outside of the housing 5 by using both heat conduction to the second heat sink 175 and forced cooling using cooling air.

FIGS. 27 to 31 disclose a thirteenth embodiment of the present invention.

The thirteenth embodiment is a modification of the tenth embodiment. The difference from the tenth embodiment is the layout of the heat pipe 220 and the thermal connection of the heat pipe 220 with the first heat sink 23.

Figure 28:
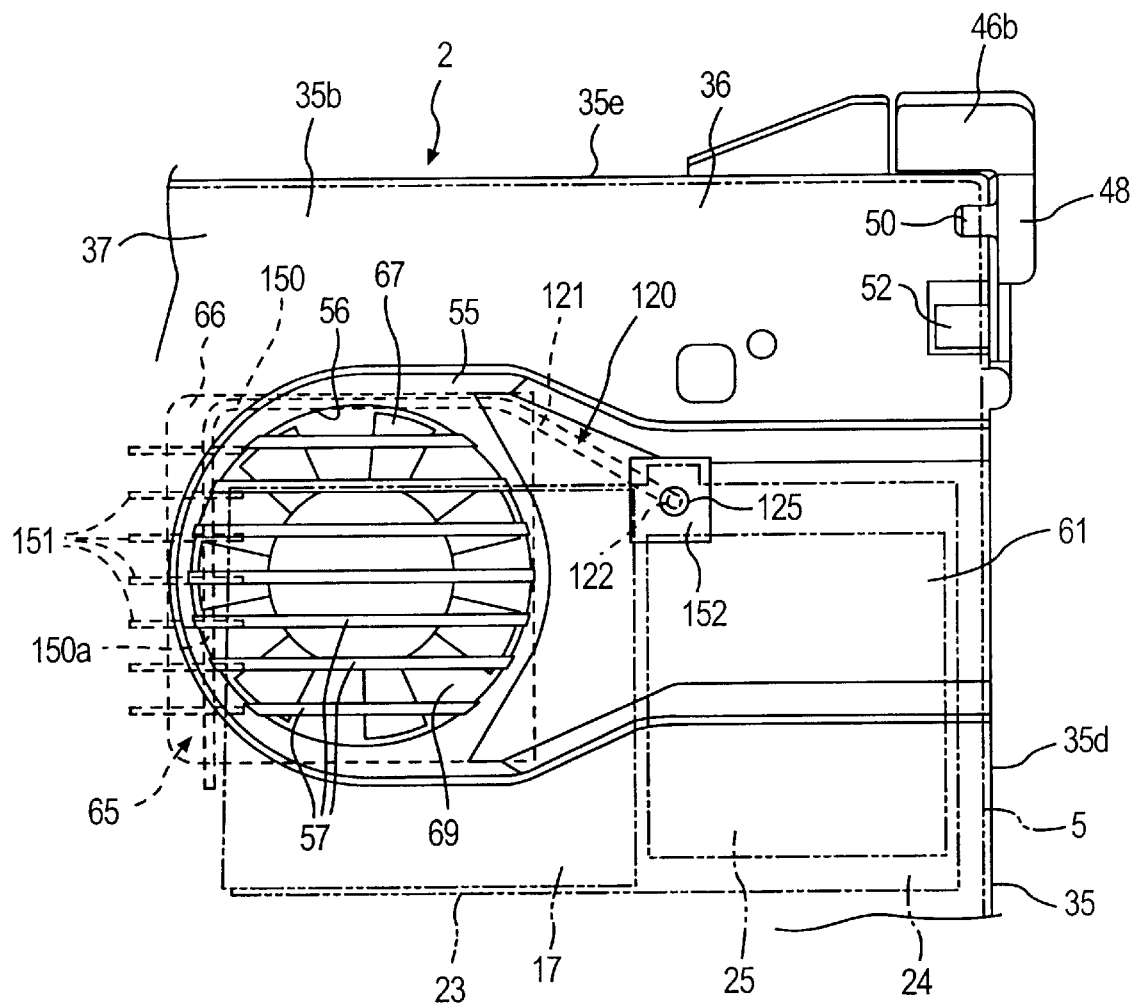
FIG. 28 is a plan view showing the extension device to illustrate the cooling air passage and an arrangement of the heat pipe with respect to the fan unit.
Figure 29:
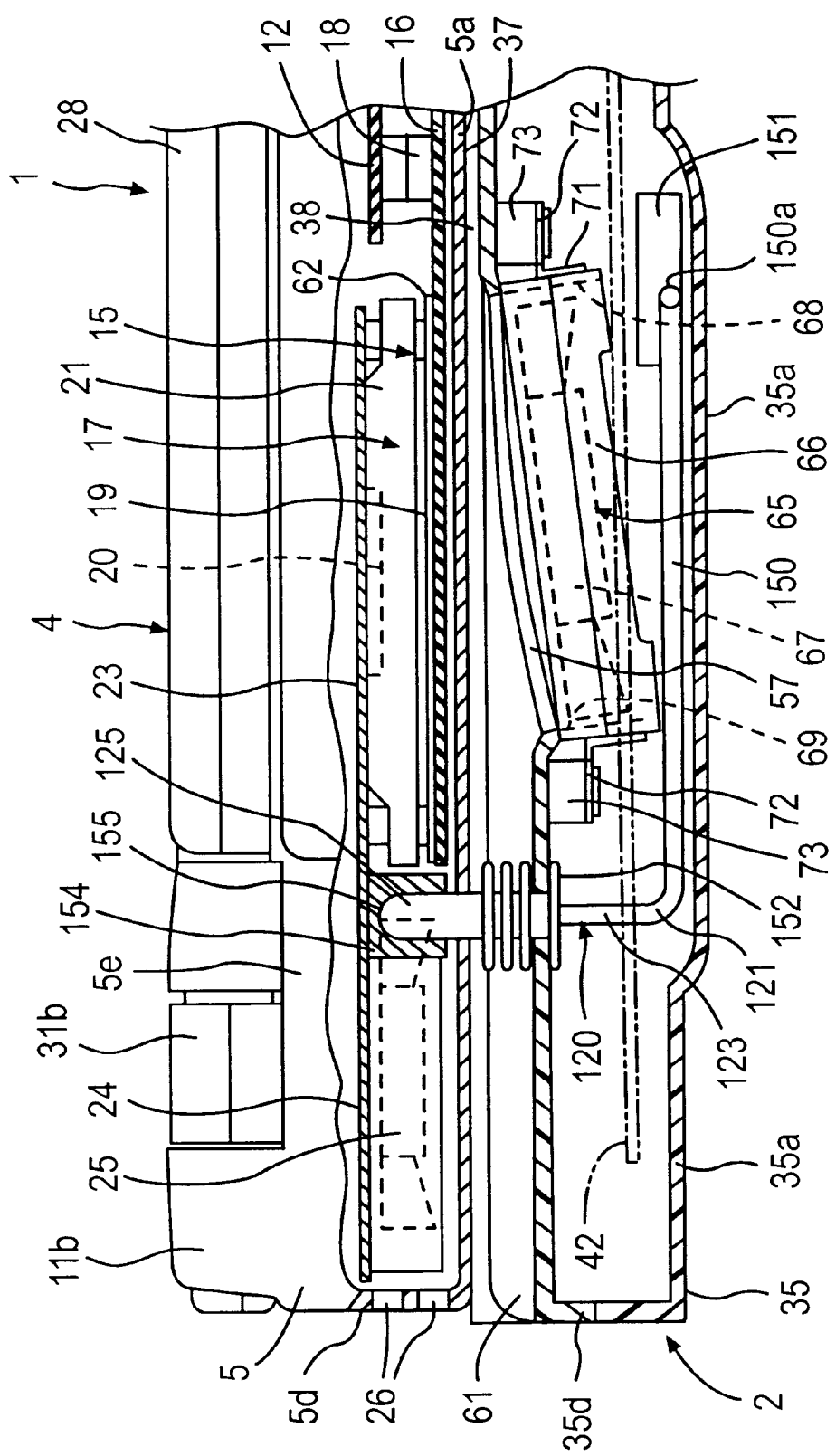
FIG. 29 is a cross sectional view showing a state in which the portable computer is mounted on the mounting face of the extension device.
Figure 30:
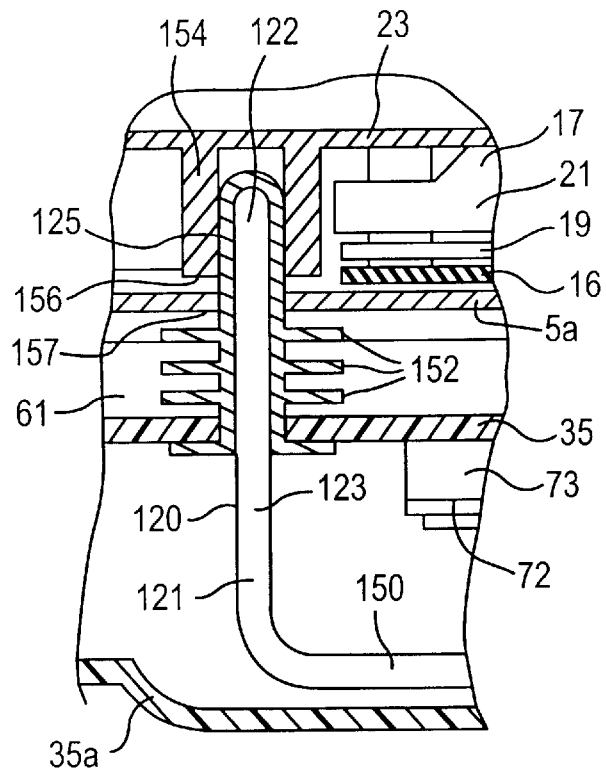
FIG. 30 is a cross sectional view showing a state in which the heat pipe and the first heat sink is fitted to each other.
Figure 31:
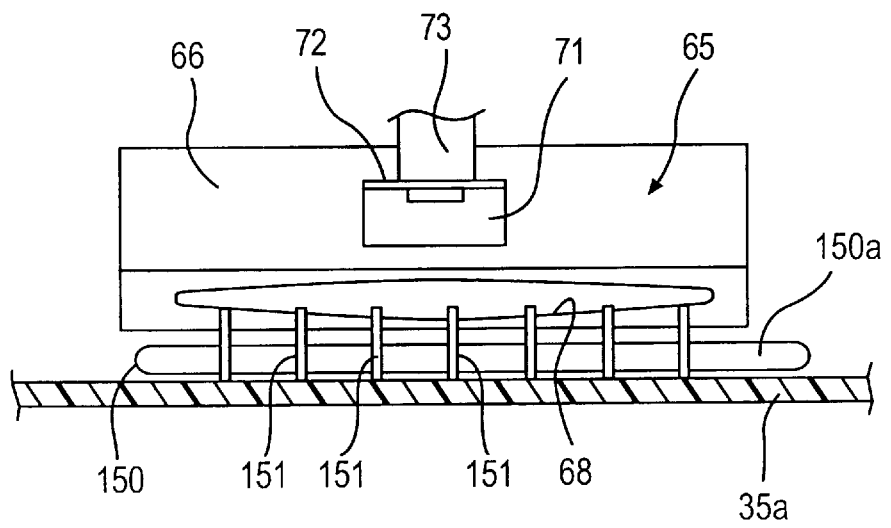
FIG. 31 is a cross sectional view showing the positional relationship between a third portion of the heat pipe and a suction port of a fan casing.

As shown in FIGS. 28 and 29, a pipe body 121 of the heat pipe 220 has a third portion 150 which is connected to the first portion 122. The third portion 150 is introduced into a portion below the fan unit 65. Moreover, the third portion 150 is bent into an L-shape mountable along two adjacent sides of the fan casing 66 at a position below the fan unit 65. A tip 150a of the third portion 150 extends in a direction of the length of the body 35. Moreover, the tip 150a is opposed to the suction port 68 of the fan casing 66. A plurality of radiating fins 151 disposed apart from one another is attached to the tip 150a of the third portion 150.

The pipe cover 125 for covering the first portion 122 of the heat pipe 220 has a plurality of radiating fins 152. The radiating fins 152 are in the exhaust passage 61, and disposed apart from one another in the axial direction of the pipe cover 125.

As shown in FIG. 29, the module substrate 16 of the portable computer 1 is disposed along the bottom wall 5a of the housing 5. The MPU 17 is supported on the upper face of the module substrate 16 through the MPU holder 19. The first heat sink 23 is attached to the upper face of the case 21 of the MPU 17. The first heat sink 23 is disposed apart from the bottom wall 5a of the housing 5 for a distance corresponding to the thickness of each of the module substrate 16 and the MPU 17. The fan unit 25 is attached to the lower face of the fan fixing portion 24 of the first heat sink 23.

The first heat sink 23 has a boss portion 154 projecting downwards and formed integrally with the first heat sink 23. The boss portion 154 is formed between the MPU 17 and the fan unit 25. A fitting concave portion 155 is formed on the lower face of the boss portion 154. The pipe cover 125 is removably fitted to the fitting concave portion 155 and has an insertion port 156 opened in the lower face of the boss portion 154.

The lower face of the boss portion 154 is disposed adjacent to the internal face of the bottom wall 5a of the housing 5. The bottom wall 5a has an opening 157 formed at a position corresponding to the boss portion 154. The opening 157 is opposed to the insertion port 156 of the boss portion 154.

Therefore, when the housing 5 of the portable computer 1 is mounted on the mounting face 37 of the extension device 2, the first portion 122 of the heat pipe 220 is introduced into the insertion port 156 through the opening 157 of the bottom wall 5a. Thus, the first portion 122 of the heat pipe 220 is fixed to the fitting concave portion 155 of the first heat sink 23 through the pipe cover 125. Therefore, the heat pipe 220 and the first heat sink 23 are thermally connected to each other.

With such a structure, when the heat of the IC chip 20 has been transferred to the first heat sink 23, the heat can directly be transferred to the first portion 122 of the heat pipe 220. By the heat conduction, the actuating medium in the pipe body 121 is heated so as to be formed into vapor. Then, the vapor flows from the first portion 122 of the heat pipe 220 to the third portion 150 through the second portion 123.

Since the third portion 150 of the heat pipe 220 is introduced into the extension device 2, the temperature of the third portion 150 is lower than that of the first portion 122. Moreover, a low internal pressure of the third portion 150 is maintained. Since the third portion 150 is opposed to the suction port 68 of the fan casing 66, the third portion 150 is disposed on the passage for air which flows toward the suction port 68 under conditions that the fan unit 65 is driven. Since a plurality of radiating fins 151 is fixed to the tip 150a of the third portion 150, a sufficiently large area of contact with air can be maintained. Therefore, the third portion 150 can be significantly cooled by the forced convection using the air as a medium.

Therefore, the vapor introduced into the third portion 150 is radiated and condensed in the third portion 150, and then refluxed from the second portion 123 to the first portion 122. Then vapor is again received the heat of the first heat sink 23 so as to be evaporated. The evaporation and condensation of the actuating medium are repeated so that the heat of the first heat sink 23 is discharged to the outside of the housing 5.

After the fan unit 65 is driven, the air in the body 35 is blown off from the exhaust port 56 to the exhaust passage 61. Then, the air serving as cooling air is applied to the bottom wall 5a of the housing 5 and the pipe cover 125. Therefore, the MPU 17 and the bottom wall 5a on which a thermal effect of the first heat sink 23 is exerted can be significantly cooled by the forced convection using the air as a medium. Thus, the heat radiating performance of the housing 5 can be enhanced.

Therefore, the heat of the IC chip 20 transferred to the first heat sink 23 can efficiently be discharged to the outside of the housing 5 by using both heat conduction by the heat pipe 220 and forced air cooling of the housing 5. Therefore, even if the size of each of the first heat sink 23 and the fan unit 25 for enhancing the radiation of the IC chip 20 is reduced, the temperature of the MPU 17 can be kept within the range of an operation guarantee temperature.

FIG. 32 discloses a fourteenth embodiment of the present invention.

The fourteenth embodiment is similar to the eleventh embodiment. The difference from the eleventh embodiment is that the second heat sink 130 provided in the exhaust passage 61 is thermally connected to the first heat sink 23.

As shown in FIG. 32, the first heat sink 23 of the housing 5 comprises a pair of boss portions 160 (only one is illustrated) projecting downwards. The boss portions 160 are disposed apart from each other between the MPU 17 and the fan unit 25 in the direction of the length of the housing 5. Fitting concave portions 161 are formed in the lower face of the boss portions 160. The fitting projections 131a and 131b of the second heat sink 130 are removably fitted to the fitting concave portion 161. Each of the fitting concave portion 161 has an insertion port 162 opened in the lower face of the boss portions 160.

The lower faces of the boss portions 160 are disposed adjacent to the internal face of the bottom wall 5a of the housing 5. The bottom wall 5a has a pair of openings 163 (only one is illustrated) formed at positions corresponding to the boss portions 160. The openings 163 face insertion ports 162 of the boss portions 160.

With such a structure, in the state in which the housing 5 of the portable computer 1 is mounted on the mounting face 37 of the extension device 2, the fitting projections 131a and 131b of the second heat sink 130 are fitted to the fitting concave portion 161 of the first heat sink 23. Thus, the second heat sink 130 and the first heat sink 23 are thermally connected to each other.

Therefore, the heat of the IC chip 20 transferred to the first heat sink 23 is transferred from the fitting concave portion 161 to the fitting projections 131a and 131b of the second heat sink 130. Then, the heat is diffused by thermal conduction from the fitting projections 131a and 131b to the connecting portion 132. Therefore, the heat capacity of the first heat sink 23 can be increased.

The fan unit 65 of the extension device 2 is driven with an increase in the temperature of the IC chip 20, the air in the body 35 is blown off from the exhaust port 56 to the exhaust passage 61. Air serving as cooling air is applied to the bottom wall 5a of the housing 5 and the second heat sink 130. The connecting portion 132 of the second heat sink 130 extends in a direction traversing the flow of the cooling air. Moreover, the connecting portion 132 has a plurality of radiating fins 133. Therefore, a sufficiently large area of contact with cooling air can be maintained. Thus, the connecting portion 132, together with the bottom wall 5a, can be cooled by forced convection using the air as a medium.

Therefore, the heat of the IC chip 20 transferred to the first heat sink 23 can efficiently be discharged to the outside of the housing 5 by using both of the heat conduction to the second heat sink 130 and forced cooling using cooling air. Therefore, even if the size of each of the first heat sink 23 and the fan unit 25 is reduced, the temperature of the MPU 17 can be kept within the range of an operation guarantee temperature.

Although each of the embodiments has the fan unit disposed at the exhaust port of the body, the present invention is not limited thereto. For example, the fan unit may be disposed in the body at a position apart from the exhaust port or in the vicinity of the suction port.

As described above, according to the present invention, the undesirable introduction of foreign matter dropped in the extension device into a deep portion of the extension device can be reduced. Therefore, the occurrence of short circuit and malfunction by the drop of the foreign matter can be reduced. Moreover, flow of cooling air with the operation of the fan unit is not obstructed by the convex portion. In addition, a fine guard is not required for preventing introduction of foreign matter into the opened portion of the opening (the exhaust port). Therefore, a sufficiently large substantial area of the opening (the exhaust port) can be secured to sufficiently reduce resistance of cooling air passing through the opening (the exhaust port). Thus, satisfactory cooling performance of an electronic apparatus can be maintained.

Cooling air may be sucked into the extension device through a gap between the bottom wall of the housing of the portable computer and the mounting portion of the extension device. Therefore, the housing can be cooled by using the flow of the cooling air.

Since the position of the opening for sucking air is raised with respect to the face on which the extension device is disposed, dust or the like on the face on which the extension device is disposed cannot easily be sucked into the extension device. Therefore, introduction of dust into the extension device can be minimized. Thus, the malfunctions and troubles of the extension device caused from dust can be reduced.

The air in the housing is sucked into the extension device through the first and second connector holes for exposing the first and second expanding connectors to the outside. Therefore, it is not necessary to provide opening for sucking air for the housing of the electronic apparatus and the mounting portion of the extension device. Therefore, the structures of the casing and the extension device can be simplified.

According to the present invention, the heat of the heating members is transferred from the casing to the extension device through various heat conductors, as long as the electronic apparatus is connected to the extension device. Therefore, apparently, the heat capacity of the casing can be increased. Therefore, the heat of the heat generating members can efficiently be discharged to the outside of the housing.

What is claimed is:

1. An electronic equipment system comprising:

an electronic device; and an extension device having a mounting portion on where said electronic device is detachably mounted, said extension device providing expanded functionality of said electronic device, said extension device including a fan unit for cooling, an opening portion formed in said mounting portion, a bottom portion facing said opening portion, and a plurality of protrusions formed on said bottom portion, protruding toward said opening portion, and arranged spaced apart in a circumferential direction of said opening portion.

2. An electronic equipment system according to claim 1, wherein said fan unit is disposed on the inside of said opening portion and blows cooling air toward the electronic device mounted on said mounting portion.

3. An electronic equipment extension device comprising:

a base having a mounting portion facing a bottom wall of an electronic device and on which the electronic device is detachably mounted, and a first opening portion formed in said mounting portion; and an expansion device for expanding the functions of the electronic device in a state in which the electronic device is mounted on the mounting portion;

a second opening portion formed in the bottom wall of the electronic device and facing said first opening portion, a fan unit disposed between said first opening portion and said second opening portion; and wherein said base has a plurality of protrusions arranged to maintain a distance between the first and second opening portions and surround the first opening portion and protrude toward the second opening portion of the base.

* * * * *